(12) United States Patent
Honarvar et al.

(10) Patent No.: US 6,708,155 B1
(45) Date of Patent: Mar. 16, 2004

(54) DECISION MANAGEMENT SYSTEM WITH AUTOMATED STRATEGY OPTIMIZATION

(75) Inventors: Laurence Honarvar, Arnold, MD (US); Steven Fatigante, San Francisco, CA (US); Traci Showalter, Centreville, VA (US)

(73) Assignee: American Management Systems, Inc., Fairfax, VA (US)

( * ) Notice: Subject to any disclaimer, the term of this patent is extended or adjusted under 35 U.S.C. 154(b) by 0 days.

(21) Appl. No.: 09/348,161

(22) Filed: Jul. 7, 1999

(51) Int. Cl.[7] .............................................. G06F 17/60

(52) U.S. Cl. ................... 705/7; 705/10; 706/19; 700/28; 700/36

(58) Field of Search ................ 705/7, 10, 11; 706/15, 19; 703/6; 700/28, 36

(56) References Cited

U.S. PATENT DOCUMENTS

| | | | |
|---|---|---|---|
| 5,177,684 A | | 1/1993 | Harker et al. ............... 364/436 |
| 5,182,793 A | | 1/1993 | Alexander et al. ............ 395/13 |
| 5,278,751 A | * | 1/1994 | Adiano et al. .............. 364/402 |
| 5,404,292 A | | 4/1995 | Hendrickson .......... 364/413.02 |
| 5,406,477 A | * | 4/1995 | Harhen ....................... 364/401 |
| 5,481,647 A | | 1/1996 | Brody et al. .................. 395/51 |
| 5,517,405 A | | 5/1996 | McAndrew et al. ........ 364/401 |
| 5,521,814 A | * | 5/1996 | Teran et al. ................. 364/402 |
| 5,630,127 A | | 5/1997 | Moore et al. ................. 395/615 |
| 5,649,116 A | | 7/1997 | McCoy et al. .............. 395/238 |
| 5,687,322 A | | 11/1997 | Deaton et al. .............. 395/214 |
| 5,696,907 A | | 12/1997 | Tom ............................. 395/238 |
| 5,706,406 A | | 1/1998 | Pollock ......................... 395/55 |
| 5,875,236 A | | 2/1999 | Jankowitz et al. .......... 379/114 |
| 5,930,762 A | * | 7/1999 | Masch ............................. 705/7 |
| 5,930,764 A | | 7/1999 | Melchione et al. ........... 705/10 |
| 5,940,816 A | | 8/1999 | Fuhrer et al. ................. 706/13 |
| 5,953,704 A | | 9/1999 | McIlroy et al. ............... 705/2 |
| 5,963,910 A | * | 10/1999 | Ulwick ............................ 705/7 |
| 5,978,784 A | * | 11/1999 | Fagg, III et al. ............... 706/45 |
| 6,009,420 A | | 12/1999 | Fagg, III et al. ............... 706/45 |
| 6,012,051 A | | 1/2000 | Sammon, Jr. et al. ........ 706/52 |
| 6,016,477 A | | 1/2000 | Ehnebuske et al. ............ 705/7 |
| 6,018,718 A | | 1/2000 | Walker et al. ................. 705/14 |
| 6,021,397 A | | 2/2000 | Jones et al. ................... 705/36 |
| 6,029,138 A | | 2/2000 | Khorasani et al. ............. 705/2 |
| 6,029,149 A | | 2/2000 | Dykstra et al. ............... 705/38 |
| 6,029,153 A | | 2/2000 | Bauchner et al. ............. 705/42 |
| 6,115,691 A | | 9/2000 | Ulwick ........................... 705/7 |

(List continued on next page.)

FOREIGN PATENT DOCUMENTS

| | | | | |
|---|---|---|---|---|
| EP | 0 205 873 A2 | | 12/1986 | ............. G06F/9/44 |
| EP | 0 230 349 A2 | | 7/1987 | ............. G06F/9/44 |
| EP | 0643344 A1 | * | 3/1995 | ......... G05B/19/418 |
| EP | 0 762 306 A2 | | 3/1997 | ........... G06F/17/60 |
| EP | 0 849 693 A2 | | 6/1998 | ........... G06F/17/60 |

(List continued on next page.)

OTHER PUBLICATIONS

Westlake, Real–time process optimization aids oil production operation, Nov. 1998, Oil and Gas Journal, pp. 62–67.*

Primary Examiner—Joseph Thomas
Assistant Examiner—Christopher L. Gilligan
(74) Attorney, Agent, or Firm—Staas & Halsey LLP

(57) ABSTRACT

An apparatus and method for automatically optimizing a strategy of a decision management system. More specifically, a computer-implemented decision management system applies a strategy to determine actions to be taken, monitors performance based on the taken actions, and refines the strategy in accordance with the monitored performance. An end user of the system selects a part of the strategy for optimization, and selects criteria for optimizing the selected part of the strategy. The decision management system then automatically optimizes the selected part of the strategy in accordance with the selected criteria. The end user can decide whether or not to implement the optimized strategy in production.

15 Claims, 28 Drawing Sheets

U.S. PATENT DOCUMENTS

| | | | |
|---|---|---|---|
| 6,119,103 A | 9/2000 | Basch et al. .................... | 705/35 |
| 6,125,359 A | 9/2000 | Lautzenheiser et al. ....... | 706/60 |
| 6,128,599 A | 10/2000 | Walker et al. ................. | 705/14 |
| 6,151,565 A | 11/2000 | Lobley et al. .................. | 703/2 |
| 6,163,604 A | 12/2000 | Baulier et al. ............... | 379/189 |
| 6,182,060 B1 | 1/2001 | Hedgcock et al. ............. | 707/1 |
| 6,188,988 B1 | 2/2001 | Barry et al. .................... | 705/3 |
| 6,236,975 B1 | 5/2001 | Boe et al. ....................... | 705/7 |
| 6,249,775 B1 | 6/2001 | Freeman et al. ............... | 705/36 |
| 6,275,818 B1 | 8/2001 | Subramanian et al. ......... | 707/2 |
| 6,286,005 B1 | 9/2001 | Cannon ....................... | 707/100 |
| 6,292,787 B1 | 9/2001 | Scott et al. .................... | 705/36 |
| 6,308,162 B1 * | 10/2001 | Ouimet et al. .................. | 705/7 |

FOREIGN PATENT DOCUMENTS

| | | | | |
|---|---|---|---|---|
| EP | 0 915 422 A1 | 5/1999 | ........... | G06F/11/22 |
| EP | 1 035 485 A2 | 9/2000 | ........... | G06F/17/60 |
| EP | 1 073 249 A2 | 1/2001 | ........... | H04M/7/00 |
| EP | 1 102 187 A2 | 5/2001 | ........... | G06F/17/60 |
| EP | 1 139 257 A1 | 10/2001 | ........... | G06F/17/60 |
| GB | 0643344 A1 * | 3/1995 | ......... | G05B/19/418 |
| WO | WO 97/09666 | 3/1997 | | |
| WO | WO 97/29447 | 8/1997 | ........... | G06F/19/00 |
| WO | WO 97/34246 | 9/1997 | ........... | G06F/17/60 |
| WO | WO 98/49641 | 11/1998 | ........... | G06F/17/60 |
| WO | WO 98/49642 | 11/1998 | ........... | G06F/17/60 |
| WO | WO 98/54667 | 12/1998 | ........... | G06F/17/60 |
| WO | WO 99/09503 | 2/1999 | ........... | G06F/17/60 |
| WO | WO 99/13427 | 3/1999 | ........... | G06K/7/00 |
| WO | WO 99/39290 | 8/1999 | ........... | G06F/17/60 |
| WO | WO 00/34910 | 6/2000 | ........... | G06F/17/60 |
| WO | WO 00/34911 | 6/2000 | ........... | G06F/17/60 |
| WO | WO 00/54186 | 9/2000 | ........... | G06F/17/30 |
| WO | WO 00/57312 | 9/2000 | ........... | G06F/17/30 |
| WO | WO 00/65502 | 11/2000 | ........... | G06F/17/60 |
| WO | WO 00/72268 A1 | 11/2000 | ........... | G06T/11/20 |
| WO | WO 01/16851 A2 | 3/2001 | ........... | G06F/17/60 |
| WO | WO 01/39090 A1 | 5/2001 | ........... | G06F/17/60 |
| WO | WO 01/39589 A2 | 6/2001 | | |
| WO | WO 01/45012 A2 | 6/2001 | ........... | G06F/17/60 |
| WO | WO 01/46876 A2 | 6/2001 | ........... | G06F/17/60 |
| WO | WO 01/50306 A2 | 7/2001 | ........... | G06F/17/00 |
| WO | WO 01/50336 A1 | 7/2001 | ........... | G06F/17/27 |
| WO | WO 01/57756 A1 | 8/2001 | ........... | G06F/17/60 |
| WO | WO 01/61598 A1 | 8/2001 | ........... | G06F/17/60 |
| WO | WO 01/75754 A1 | 10/2001 | ........... | G06F/17/60 |

* cited by examiner

|  | BRONZE | GOLD | PLATINUM |
|---|---|---|---|
| TEST GROUP 1 | STRATEGY TEST CELL 1 | STRATEGY TEST CELL 2 | STRATEGY TEST CELL 3 |
| TEST GROUP 2 | STRATEGY TEST CELL 4 | STRATEGY TEST CELL 5 | STRATEGY TEST CELL 6 |
| TEST GROUP 3 | STRATEGY TEST CELL 7 | STRATEGY TEST CELL 8 | STRATEGY TEST CELL 9 |

FIG. 6
(PRIOR ART)

| OBSERVATION TIME | PERFORMANCE TIME | SEGMENT | TEST GROUP | CATEGORY | REPORT GROUP | DELQ | % CREDIT LINE USED | VALUE | PROFIT |
|---|---|---|---|---|---|---|---|---|---|
| 1/98 | 1/98 - 6/98 | 1 | 1 | BRONZE | A | # | # | # | # |
| 1/98 | 1/98 - 6/98 | 1 | 1 | BRONZE | B | # | # | # | # |
| 1/98 | 1/98 - 6/98 | 1 | 1 | BRONZE | C | # | # | # | # |
| 1/98 | 1/98 - 6/98 | 4 | 2 | GOLD | F | # | # | # | # |

Columns 1–6: DIMENSIONS; Columns 7–10: METRICS; Overall: ACCUMULATED PERFORMANCE DATA

FIG. 9
(PRIOR ART)

| DIMENSIONS | | | | | METRICS | | |
|---|---|---|---|---|---|---|---|
| SYSTEM | VERSION | SEGMENT | FUNCTION | REPORT GROUP | DELINQUENCY RATE | BAD RATE | UTILIZATION RATE |
| ORIGINATIONS | VERSION 1 | CREDIT CARD | RISK MODEL | | 3.45% | 1.75% | 65% |
| COLLECTIONS | VERSION 7 | NORTH REGION | PAYMENT TREE | PATH A | 2.40% | 1.34% | 76% |

FIG. 15

| SYSTEM | VERSION | CRITERIA TYPE | COMPONENT TYPE | CRITERIA ORDER | ASCENDING/DESCENDING | CRITERIA | THRESHOLD |
|---|---|---|---|---|---|---|---|
| ORIGINATIONS | VERSION | DIMENSION | SYSTEM | 1 | | ORIGINATIONS | |
| ORIGINATIONS | VERSION | DIMENSION | SEGMENT | 2 | | CREDIT CARD | |
| ORIGINATIONS | VERSION | METRIC | | 1 | ASCENDING | BAD RATE | ≤ 6% |

FIG. 17

| DIMENSIONS | | | | | | METRICS | | |
|---|---|---|---|---|---|---|---|---|
| SYSTEM | VERSION | SEGMENT | TEST GROUP | FUNCTION | REPORT GROUP | DELINQUENCY RATE | BAD RATE | UTILIZATION RATE |
| ORIGINATIONS | VERSION 1 | CREDIT CARD | CHALLENGER | RISK MODEL | | 3.45% | 1.75% | 65% |
| COLLECTIONS | VERSION 7 | NORTH REGION | CHAMPION | PAYMENT TREE | PATH A | 2.40% | 1.34% | 76% |

FIG. 25

DECISION MANAGEMENT SYSTEM WITH AUTOMATED STRATEGY OPTIMIZATION

CROSS-REFERENCE TO RELATED APPLICATIONS

This application is related to U.S. application titled DECISION MANAGEMENT SYSTEM FOR CREATING STRATEGIES TO CONTROL MOVEMENT OF CLIENTS ACROSS CATEGORIES, U.S. Ser. No. 09/217,017, filed Dec. 21, 1998, and which is incorporated herein by reference. Now U.S. Pat. No. 6,321,206.

This application is related to U.S. application titled SIMULTANEOUS CUSTOMER/ACCOUNT STRATEGY EXECUTION IN A DECISION MANAGEMENT SYSTEM, U.S. Ser. No. 09/216,985, filed Dec. 21, 1998, and which is incorporated herein by reference.

This application is related to U.S. application titled USE OF ONLINE ANALYTICAL PROCESSING (OLAP) IN A RULES BASED DECISION MANAGEMENT SYSTEM, U.S. Ser. No. 09/217,016, filed Dec. 21, 1998, and which is incorporated herein by reference. Now U.S. Pat. No. 6,430,545.

This application is related to U.S. application titled VERSIONING IN A RULES BASED DECISION MANAGEMENT SYSTEM, U.S. Ser. No. 09/219,341, filed Dec. 23, 1998, and which is incorporated herein by reference.

This application is related to U.S. application titled PARAMETER HIERARCHY FOR A DECISION MANAGEMENT SYSTEM, U.S. Ser. No. 09/219,340, filed Dec. 23, 1998, and which is incorporated herein by reference.

This application is related to U.S. application titled DECISION MANAGEMENT SYSTEM WHICH IS CROSS-FUNCTION, CROSS-INDUSTRY AND CROSS-PLATFORM, U.S. Ser. No. 09/219,338, filed Dec. 23, 1998, and which is incorporated herein by reference.

This application is related to U.S. application titled DECISION MANAGEMENT SYSTEM PROVIDING QUALITATIVE ACCOUNT/CUSTOMER ASSESSMENT VIA POINT IN TIME SIMULATION, U.S. Ser. No. 09/258,348, filed Feb. 26, 1999, and which is incorporated herein by reference. Now U.S. Pat. No. 6,405,173.

BACKGROUND OF THE INVENTION

1. Field of the Invention

The present invention relates to a decision management system for creating and applying strategies to manage clients, such as customers, accounts, or applicants, of an organization. More specifically, the present invention relates to a decision management system having automated strategy optimization capabilities.

2. Description of the Related Art

A typical organization maintains a significant amount of information about its clients, where "clients" refers to the customers, accounts or applicants for services or products of the organization. This information can be used effectively, for example, to increase productivity and reduce costs, while achieving the goals of the organization. Such goals may be to improve profitability and maximize customer value.

For example, a company may sell various products to its customers, and may maintain a significant amount of information relating to its customers. This information can be used to improve many critical interactions with the customers, such as marketing communications, sales calls, customer service, collections, and general relationship management activities.

Consider the following examples.

Assume that a diversified financial services company is trying to leverage its customer base by cross-selling its various products. It currently uses limited internal customer information and credit bureau information to identify existing customers for cross-sell campaigns. For example, they might send "invitations to apply" for a home equity loan to those customers who own a mortgage with the company, and meet a minimum credit bureau score threshold. Imagine how much more powerful their cross-selling efforts would be if they could use information from all of the customers' accounts to offer pre-approved home equity loans to customers where the likelihood of a sale was high, the probability of default was low, and the financial value of that sale was high.

As another example, assume that a regional bell operating company is currently applying only age-based criteria (e.g., "days past due") to its accounts receivable portfolio to identify candidates for its collections department and to handle those customers. The content of the outbound collection notices and phone calls is driven solely by the age and amount of a customer's unpaid balance. Imagine if the company had a tool that helped it select and prioritize collection accounts based on the likelihood of a customer interaction making a bottom line difference. Instead of calling or writing all overdue accounts, they could focus resources on those where the customer interaction would make the greatest difference. In addition, they would save the expense and ill will generated by calling customers who would pay without a collections contact.

As a still further example, assume that a manager of a large telephone customer service center for a super-regional bank has been given only hard-line corporate policy to make decisions about fee and rate concessions. While her service reps attempt to stay to the company line, she is deluged with requests from good customers to talk to the manager. She uses her judgment based on the incomplete information available to her to decide which concessions are appropriate to prevent attrition of profitable customers. Just imagine if the service reps had guidelines that were specific to each customer, based upon customer data that indicates their value to the organization, likelihood of attrition, risk level, and other characteristics. The manager could stand by these guidelines with confidence. There would be no concessions made to unprofitable customers, fewer manager overrides, shorter calls, and reduced attrition of the customers they want to keep.

As diverse as the above examples appear on the surface, they share several common characteristics. Each involves a large customer base and a high volume of customer interactions. Each organization has a substantial amount of accumulated data regarding the characteristics, purchasing/behavior patterns, and profitability of customers (though the data may not yet be well organized or analyzed). Each organization has an opportunity to improve performance substantially by treating different customers and customer groups differently, due to diversity in customer relationships and their potential. In each case, there are desired outcomes that could result from alternative customer interactions (e.g., customer purchases a product, pays an outstanding bill, increases deposit balances), and those outcomes can readily be identified, quantified, and tracked.

Therefore, each of the above examples depicts a business situation that currently is not fully benefiting from decision support and therefore is yielding less than optimal results.

There are software based decision management systems in the marketplace which can organize information to make more effective decisions. Generally, a software based decision management system applies strategies to determine actions to be taken, monitors performance based on the taken actions, and refines the strategies in accordance with the monitored performance.

FIG. 1 is a diagram illustrating the general concept of a software-based decision management system. Referring now to FIG. 1, a software based system 10 receives information from operational and/or customer information systems 20, such as, for example, billing systems, account management systems, credit bureau systems and data warehouses. Software based system 10 prioritizes and tailors customer interactions based on predictive information, specific business rules, and continually evolving decision strategies. Software based system 10 then determines an appropriate action which is to be taken by an action-taking system 30. An appropriate action to be taken could include, for example, a call to a customer, a specific collections procedure or a specific marketing action.

A decision management system as in FIG. 1 can provide superior results, such as increased revenue generation, improved cost-effectiveness and enhanced customer relationships.

For example, the American Management Systems (AMS) Strata™ decision support system release 3.0 (hereinafter Strata™ release 3.0) is a software based decision management system which applies predictive modeling techniques to customer data, to thereby generate dramatic improvements in the effectiveness and profitability of customer interactions.

For example, FIG. 2 is a diagram illustrating the functional flow of a decision management system, such as that in Strata™ release 3.0. Referring now to FIG. 2, in step 140, an inbound event is a trigger that is received from one or more external systems to identify that a particular client event has occurred. Here, a client refers to people or entities which interact with, or do business with, an organization. For example, clients include customers, accounts or applicants for services or products of the organization. Each client has associated attributes such as, for example, client age, client balance, etc., which are maintained by the system. An attribute is a data element passed into the decision management system from an external source and/or derived by the decision management system through its own evaluation and processing.

From step 140, the system moves to step 150, where clients are assigned to different segments. A segment is a grouping of clients based on a characteristic by which the clients will be separated for applying different rules. Generally, a segment is a high-level segregation of clients for the purpose of associating largely independent high-level strategy. Thus, segments are separate groups of clients, for which a unique set of evaluation procedures have been defined. For example, a telecommunications company might have a segment for residential customers and another for business customers. Each segment can have, for example, a separate manager who is the only one with security rights to setup or modify the evaluation procedure for that segment.

From step 150, the system moves to step 155, where each segment is further divided into categories. A category is typically a grouping of clients as defined by the organization such that it aligns client interaction/value management objectives. In other words, categories represent groups of clients based on how the organization views the clients. For example, a bank may divide clients (such as credit card holders) into the categories of Bronze, Gold, and Platinum, based on how the bank views the credit worthiness of the clients.

From step 150, the system also moves to step 160, where clients are grouped in a random manner into different test groups for the purpose of applying competing policy rules, strategy, or experiments. Thus, steps 155 and 160 can be seen as being performed in parallel and/or having no interdependency.

After steps 155 and 160, each segment has now been divided into test groups and categories. Categories and test groups can be considered to be at the same level in the strategy hierarchy.

From steps 155 and 160, the system moves to step 165, where a matrix is created for each segment, with the categories and test groups on different axes, to create a strategy test cell at the intersection of each category and test group. Here, it is not necessary that a matrix be "physically" created. Instead, the data must simply be organized or arranged in some manner that allows clients to be conceptually represented in a data structure equivalent to a matrix, so that clients can be associated with, or assigned to, strategy test cells.

From step 165 the system moves to step 170, where inbound events are matched to function sets.

Function sets are decision logic modules formed by one or more "functions." Functions can be, for example, decision trees or score models. There are preferably several different functions which are available in the creation of any function set. One or more functions are typically grouped into function sets when they have comparable objectives (i.e., score cards to predict risk, decision trees to evaluate a credit line, etc.). Therefore, generally, a function set is a reusable business process triggered by one or more events. It may contain one or more strategies (functions) for accomplishing its objective.

From step 170, the system moves to step 180, where the specific function sets for one or more specific inbound events are executed.

From step 180, the system moves to step 190, where the results, or action items, are output.

FIG. 3 is a diagram illustrating an example of a segment being divided into different test groups as in step 160 of FIG. 2. Referring now to FIG. 3, 10% of the segment is randomly assigned to test group 1, 10% of the segment is randomly assigned to test group 2, and 80% of the segment is randomly assigned to test group 3.

FIGS. 4(A) and 4(B) are diagrams illustrating the matching of inbound events to function sets in step 170 of FIG. 2. Referring now to FIG. 4(A), for example, when an inbound event 91 is a credit card campaign, the following function sets are applied, in order: credit card propensity to buy score 92, risk score 93 and offer selection 94. A result 95 of the applied function sets is a determination of whether to send a credit card offer.

Similarly, referring now to FIG. 4(B), for example, when an inbound event 96 is a late payment, the following function sets are applied, in order: risk score 97, underwriting treatment 98 and overdraft decision treatment 99. A result 100 of the applied function sets is a determination whether to send new underwriting and overdraft codes.

FIG. 5 is a diagram illustrating the grouping of functions to function sets. Referring now to FIG. 5, when an inbound event 91 triggers a specific function set, the specific function to be applied to a client will be determined by the test group into which the client was assigned. This allows for strategy experimentation by defining a common sequence of function sets for a given inbound event, but differentiating the actual function that will be invoked for each function set depending on the respective test group into which the client was randomly assigned.

If a function set only contains one function, no experimentation will take place in that function set since every client, regardless of its test group, will be required to use the function. For example, in FIG. 5, no experimentation takes place in the credit card propensity to buy score 92, since this function set contains only one function. By contrast, in FIG. 5, experimentation takes place in offer selection 94, since this function set includes more than one function. This approach provides the strategy analyst with the flexibility to experiment selectively on each strategy component of the overall strategy, as appropriate.

Function sets can include many different types of functions, including, for example, decision trees, score models and matrices. Decision trees are the most common.

FIG. 6 is a diagram illustrating the creation of a matrix of the categories and test groups for a respective segment, as in step 165 of FIG. 2. Referring now to FIG. 6, categories of, for example, Bronze, Gold and Platinum are on one axis of the matrix, and test groups 1, 2 and 3 are on the other axis of the matrix. The intersection of a respective category with a respective test group represents a strategy test cell of the matrix.

Then, possibly for each function set, different strategies are designed for different strategy test cells of the matrix.

FIG. 7 is a diagram illustrating an example of the correspondence of functions of a respective function set to the strategy test cells of the matrix. Referring now to FIG. 7, various function sets, including credit card propensity to buy score 92, risk score 93 and offer selection 94, are executed in a user-defined order upon the occurrence of inbound event 91. Offer selection 94 includes a respective function, which is possibly a decision tree, for each strategy test cell.

As a strategy is designed, the strategy test cells can be examined against each other. Preferably, there is a common set of metrics for the entire matrix, where the metrics are the appropriate measurements against which to measure the performance of the strategy defined for a segment. Then, it can be determined, for example, how well a test group is shifting customers to other categories. For example, it can be determined how quickly test group 1 is moving Bronze customers into the Platinum category in the matrix of FIG. 6. The opposite undesirable effect can also be assessed. Many other types of determinations can be made, based on the various implemented strategies.

The above figures represent the logical flow of how strategy test cells are created, or assigned. However, the systematic or technical flow may be different. Moreover, the logical flow in the above figures represents only one specific example of a decision management system, and decision management systems are not limited to this example. Instead, different decision management systems can have, and likely will have, different logical flows. For example, a decision management system might not assign clients to segments (as in step 150 of FIG. 2), assign clients to categories (as in step 155 of FIG. 2), or create a matrix for each segment (as in step 165 of FIG. 2).

In addition to applying strategies, a decision management system measures performance so that the overall strategy can be appropriately adjusted to optimize results.

For example, FIG. 8 is a diagram illustrating the overall operation of the above-described decision management system for measuring performance. More specifically, FIG. 8 illustrates an example of a data aggregation operation for effectively managing and organizing data.

Referring now to FIG. 8, in step 200, for the above-described decision management system, each path through each decision tree is tagged with a unique identifier referred to as a report group. Although it is preferable to tag each path through each tree so that complex strategy can be created and refined, it is not necessary for each path to be tagged. Instead, the selection of which paths to tag is a matter of design choice, based on the strategy parameters of the decision management system.

Therefore, a report group is a tag which identifies a unique path through a strategy, and is preferably, although not necessarily, applied to terminal nodes of decision trees. A report group is preferably independent of the test group, so that it can be associated with the same branch of comparable trees in two or more test groups. Report groups are a valuable strategy evolution tool, and enable comparative evaluation of strategy effectiveness for categories within a segment. In the present example of a decision management system, categories allow for the analysis of clients who, once being individually evaluated against user-defined criteria, are determined to have similar qualities in consideration of organizational objectives. For example, a category may be defined as all customers who have average current value, high potential value, and a low probability of attrition. Report groups can be placed throughout a decision strategy in order to assure that performance results are accumulated for each respective part of the strategy.

In the present example, all clients in a given report group should be relatively homogenous, the difference being the test group to which the clients were randomly assigned and thus the action/decision applied to the clients being based on their test group. Since report groups are typically independent of test groups, they allow for comparison of the same or alternate categories across experiments (i.e., comparison within the category Platinum of a report group for the test 1 and control test groups). Decision effectiveness reports can then track specified performance metrics (i.e., response rate for marketing, approval rate for underwriting, etc.) by test group for each report group.

Referring again to FIG. 8, from step 200 the system moves to step 210, where observation points are determined. More specifically, in this example, each time a decision is made about a client, that decision is posted. More importantly, in this example, the report group that the client passed through is posted. In addition, in this example, what segment, category, test group, etc. is posted.

From step 210, the system moves to step 220, where performance over time for observation points is accumulated, and matched against the observation points. Generally, an observation point is a snap-shot of a point in time, and has dimensions across which analysis of the data can be performed. A specific client can have multiple observation points. Therefore, in step 210 in FIG. 8, observation points for a client are noted. Then, in step 220, for each client, performance data is matched against observation points. For example, once a month, performance data for a client may be obtained. This performance data is then matched, or correlated, to the appropriate observation points for each account and/or customer.

From step 220, the system moves to step 230, where the collected performance data is periodically aggregated and grouped, preferably, into all possible permutations of the dimensions noted when the observation point was taken and selected for analysis. Generally, in step 230, it is not desirable to report on a specific client, but how well a specific test group or strategy performs. For example, the data is preferably aggregated to determine the performance of segment 1, test group 4, bronze customers, report group B. An aggregate performance data measure can then be determined for all clients meeting this criteria. In this manner, it can be evaluated, for example, how well a certain test group or category performed, instead of how well a specific client performed. Thus, strategy performance can be evaluated, instead of individual client performance.

As a result of the aggregation of data, a row of data having two parts, dimensions and metrics, can be created. Dimensions are the ways the organization wants to view the performance results. For example, segment and category would be dimensions. Aggregating the data in a row allows us to view the intersection of the different points in the matrix created in step 165 of FIG. 2. For example, by aggregating the data, we can view all the metrics, or results, associated with Bronze, test group 2. The users can interactively select which dimensions to apply in filtering the results.

Therefore, the dimensions of the rows should preferably provide all the different ways in which it is intended to analyze the performance data. The dimensions would likely include combinations that allow data relating to the category assignment matrix to be viewed, and combinations that allow data relating to specific strategy paths to be viewed.

For example, a row might typically include the dimensions of segment, test group, category and report group. The metrics for that row should include data relating to those dimensions, such as, for example, delinquency, % credit line used, value, profit. Therefore, by storing dimensions as a "key" to the data, a "solution set" of metrics is obtained which matches that key.

Each row can be thought of as being a unique intersection of values for all dimensional columns. Preferably, the metrics associated with those dimensions are appropriately aggregated for every possible permutation of all of the dimensions. For example, one row can include the dimensions of segment 1, test group 1, category 1, report group 1, and the aggregate results that meet these dimensions. The next row may include the dimensions of segment 1, category 1, test group 1, report group 2, and the aggregate results that meet these dimensions.

When performing the data aggregation operation, all possible permutations of dimensions are preferably determined. Then, the results of clients meeting these dimensions should be matched to these permutations.

For example, FIG. 9 is a diagram illustrating an example of a row of data having a dimensions part and metrics part. Referring now to FIG. 9, each row includes the dimensions of observation time, performance time, segment, test group, category and report group. Preferably, a row is created for each possible permutation of the dimensions. The metrics of delinquency, % credit line used, value and profit are then matched to the various permutations of the dimensions. Generally, the metrics for a specific row should indicate the consolidation all the individual client data of all the individual clients meeting the values of the dimensions identifying that row. Therefore, the data for each specific client is not being reviewed, but instead the performance of a specific strategy is being reviewed.

The use of time dimensions, such as the dimensions of observation time and performance time, allows the movement between categories to be examined over time. Additionally, time allows for trend analysis and selective inclusion of performance points to assess when a strategy performed well/poorly.

Therefore, the data aggregation operation of FIG. 8 prepares and correlates data. In this example, the data aggregation operation can translate the correlated data into a multi-dimensional data model, to support the use of online analytical processing (OLAP) technology. Then, OLAP technology can be applied to evaluate the aggregated data. Generally, OLAP is a known technology that allows for the multi-dimensional analysis of data such that results can be reported in a manner consistent with explaining their significance or inter-relationships. OLAP is based upon the use of multi-dimensional data structures and aggregated data to ensure acceptable performance in leveraging technology. The use of OLAP in a decision management system is described in U.S. application titled USE OF ONLINE ANALYTICAL PROCESSING (OLAP) IN A RULES BASED DECISION MANAGEMENT SYSTEM, U.S. Ser. No. 09/217,016, filed Dec. 21, 1998, and which is incorporated herein by reference.

FIG. 10 is a diagram illustrating an example of a definition hierarchy of a decision management system, and provides a version level for creating different strategy versions. Referring now to FIG. 10, a version level can be interjected between a system level and a segment level. A function level is shown as being under the version level and at the same level as segment. Thus, in FIG. 10, different functions are associated with different versions and functions are associated with specific segments. Levels and associations provide the user with the ability to organize the strategy components of a strategy.

While FIG. 10 illustrates a versioning level interjected between the system level and the segment level, a versioning level can be virtually at any level in the definition hierarchy. For example, FIG. 11(A) is a diagram illustrating a definition hierarchy having the version level beneath the system level and the function level. In addition, version levels can exist simultaneously at multiple levels in the definition hierarchy. For example, FIG. 11(B) is a diagram illustrating a definition hierarchy having a version level above and beneath the function level. The use of versioning levels in a decision management system is described, for example, in U.S. application titled VERSIONING IN A RULES BASED DECISION MANAGEMENT SYSTEM, U.S. Ser. No. 09/219,341, filed Dec. 23, 1998, and which is incorporated herein by reference.

The above-described decision management system can allow hybrid strategies to be developed, based on the success of different experiments.

For example, FIG. 12 is a diagram illustrating the effectiveness of creating a hybrid strategy in a decision management system. Referring now to FIG. 12, a "test" strategy is applied to test group A, where customers in test group A are divided into two groups, TGA1 and TGA2. Group TGA1 includes all customers less than 40 years old. Group TGA2 includes all customers greater than or equal to 40 years old. A letter is sent to customers whether they are in group TGA1 or TGA2. The end result is that a letter is 60% effective for the customers in TGA1, and 70% effective for customers in TGA2. Assuming that 50% of the population is greater than or equal to 40 years old, and 50% of the population is less than 40 years old, the overall success rate of the test strategy is 65%.

Similarly, a "control" strategy is applied to test group B, where customers in test group B are divided into two groups, TGB1 and TGB2. Group TGB1 includes all customers less than 40 years old. Group TGB2 includes all customers greater than or equal to 40 years old. A call is made to customers whether they are in group TGB1 or TGB2. The end result is that a call is 50% effective for the customers in TGB1, and 90% effective for customers in TGB2. Assuming that 50% of the population is greater than or equal to 40 years old, and 50% of the population is less than 40 years old, the overall success rate of the control strategy is 70%.

An overall comparison of results of test group A (the "test" strategy) versus test group B (the "control" group) indicates that the control strategy is superior, as measured by overall success rate. However, when strategy effectiveness is reported at the comparable path level through the test and control strategies, it is possible to build a new hybrid strategy that will outperform either the test strategy or the control strategy by combining the best performing actions of each strategy. For example, the hybrid strategy would send a letter to all customers less than 40 years old, but call all customers greater than or equal to 40 years old. Such a hybrid strategy should produce an expected overall success rate of 75%, which is higher than either of the test or control strategies.

Such an approach for determining a hybrid strategy could be used, for example, to improve the strategy in offer selection 94 in FIG. 5, where different strategies are applied to different test groups. The formation of a hybrid strategy can significantly increase the effectiveness and profitability of an organization.

As can be seen from above, software based decision management systems apply strategies to determine actions to be taken, monitor performance based on the taken actions, and refine the strategies in accordance with the monitored performance.

Moreover, as can be seen from above, a strategy is formed of many different strategy components. Here, a strategy component refers to any part of a strategy implemented in a decision management system. For example, a strategy component can be a system, version, attribute, inbound event, outbound event, function, function set, segment, report instruction, continuous dimension, test group or report group.

FIG. 13 is a diagram illustrating the analysis of performance results and the recommendation of strategy changes in a conventional decision management system. Referring now to FIG. 13, in step 500, a rules editor creates and edits rules which define the strategy. From step 500, the operation moves to step 502 where a decision engine applies the strategies created and edited by the rules editor. From step 502, the process moves to step 504, where performance reporting is done, to report strategy/policy performance results to an end user of the system, such as a strategy analyst. The performance reporting may include the use of OLAP technology, as previously described.

Then, from step 504, the operation moves to step 506 where the performance results are analyzed, and strategy changes are recommend in accordance with the analyzed performance results. Step 506 is performed by the end user. Thus, the end user must manually analyze the performance results, and somehow determine what strategy changes should be recommended. This is a very complex, difficult and time consuming process. For example, it could take a very long time for the end user to analyze manually the performance results. Moreover, it may be very difficult for the end user to recognize trends or implications of the performance results. In addition, it may be very difficult for an end user to think of appropriate changes, especially if there is a large amount of performance data and potential options.

Step 506 in FIG. 13 is shown as a "?," since this step includes a significant human factor in analyzing the complicated performance results and recommending strategy changes. For example, in step 506, different end users will typically analyze the performance results in a different manner and recommend different strategy changes, and thereby potentially introduce inconsistencies.

Therefore, a conventional decision management system is limited in its ability to analyze performance results and recommend strategy changes in an efficient, effective, and consistent manner, particularly without ongoing human intervention.

SUMMARY OF THE INVENTION

Therefore, it is an object of the present invention to provide a decision management system which can analyze performance results and recommend strategy changes in an efficient, effective, and consistent manner.

Objects of the present invention are achieved by providing a computer-implemented decision management process including (a) applying a decision management strategy; (b) determining results of the applied strategy; and (c) automatically optimizing at least a part of the strategy in accordance with the determined results.

In addition, objects of the present invention are achieved by providing a computer-implemented decision management process including (a) applying a decision management strategy formed of a plurality of strategy components; (b) determining results of the applied strategy; (c) selecting a strategy component by an end user of the process; (d) selecting criteria by the end user for optimizing the selected strategy component; and (e) automatically optimizing the strategy in accordance with the determined results, the selected strategy component and the selected criteria.

Additional objects and advantages of the invention will be set forth in part in the description which follows, and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 6 (prior art) is a diagram illustrating a matrix created in a decision management system, for analyzing data and applying strategies.

FIG. 9 (prior art) is a diagram illustrating an example of a row of data having a dimensions part and metrics part, in relation to a data aggregation operation of a decision management system.

FIG. 15 is a diagram illustrating a row in a data model for aggregating and grouping performance data, according to an embodiment of the present invention.

FIG. 17 is a diagram illustrating an example of a table which would be created to save optimization criteria selected by an end user, according to an embodiment of the present invention.

FIG. 25 is a diagram illustrating a row in a data model for aggregating and grouping performance data in the case that path-level optimization is performed, according to an embodiment of the present invention.

DESCRIPTION OF THE PREFERRED EMBODIMENTS

Figure 1:
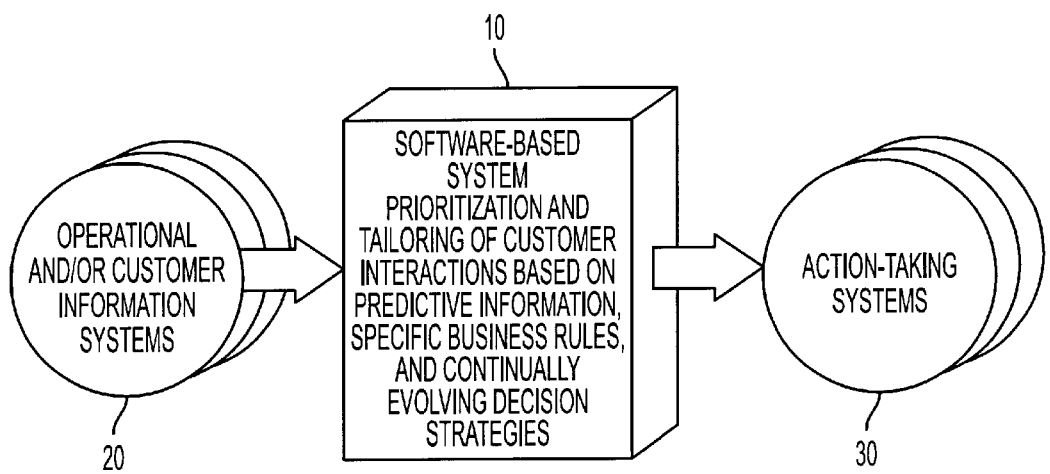
FIG. 1 (prior art) is a diagram illustrating the general concept of a software-based decision management system.
Figure 2:
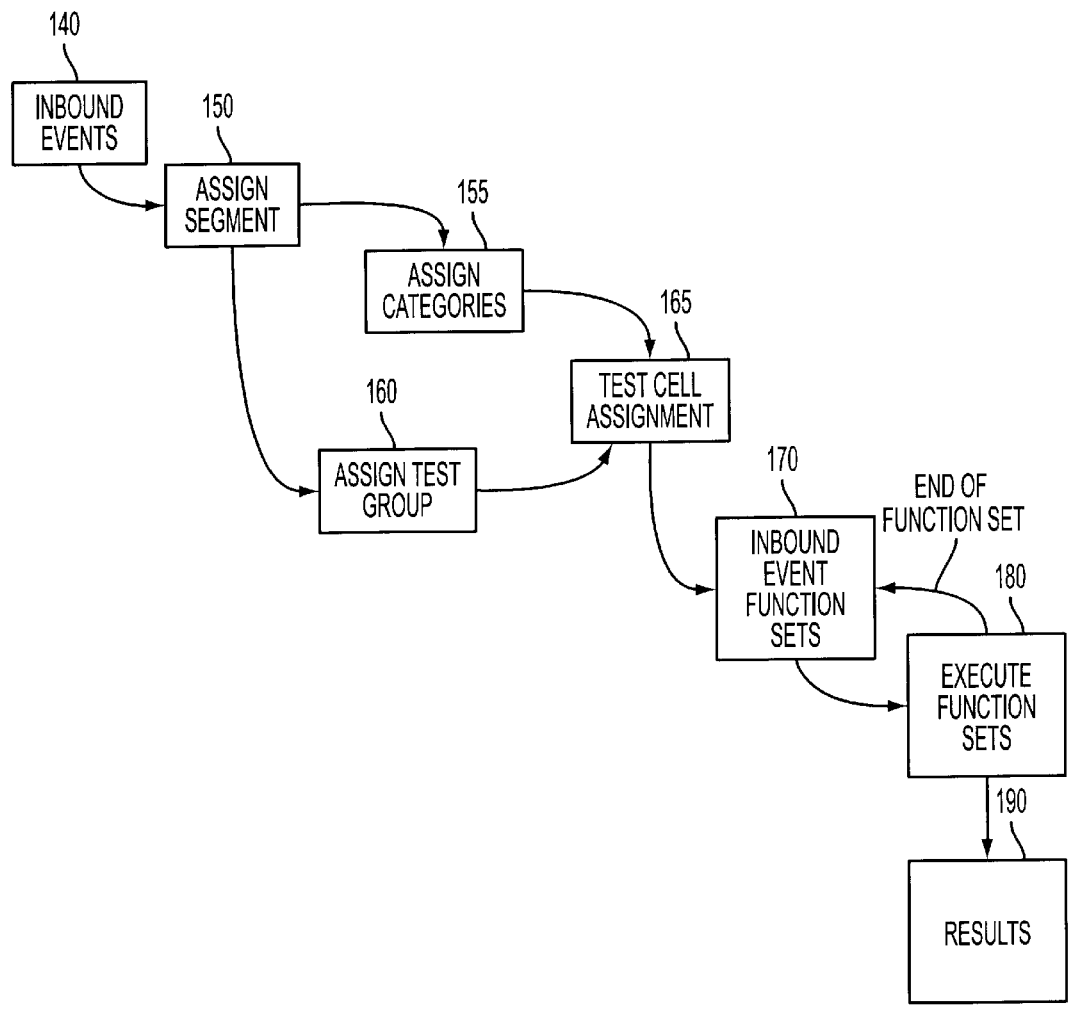
FIG. 2 (prior art) is a diagram illustrating the functional flow of a decision management system.
Figure 3:
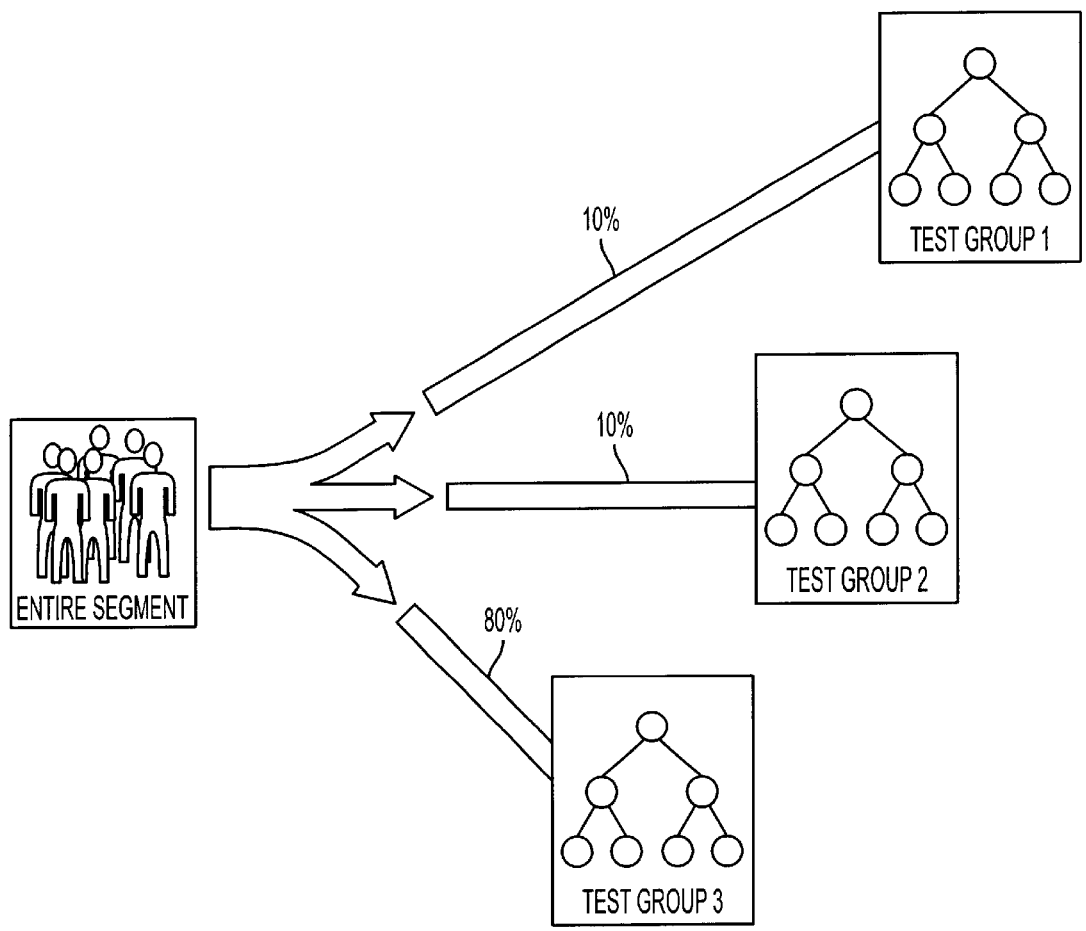
FIG. 3 (prior art) is a diagram illustrating an example of a segment being divided into different test groups in a decision management system.
Figures 4A, 4B:
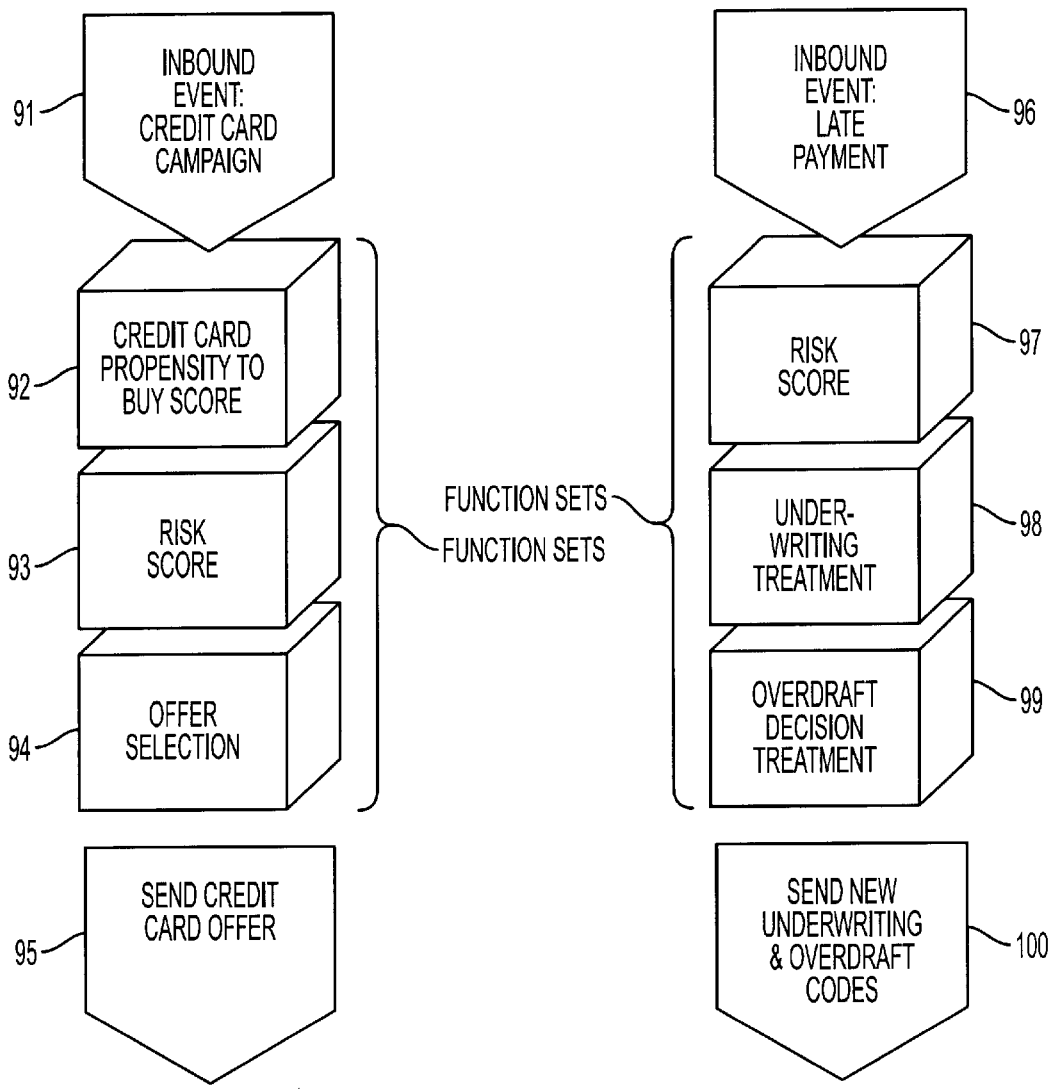
FIGS. 4(A) and 4(B) (prior art) are diagrams illustrating the matching of inbound events to function sets in a decision management system.
Figure 5:
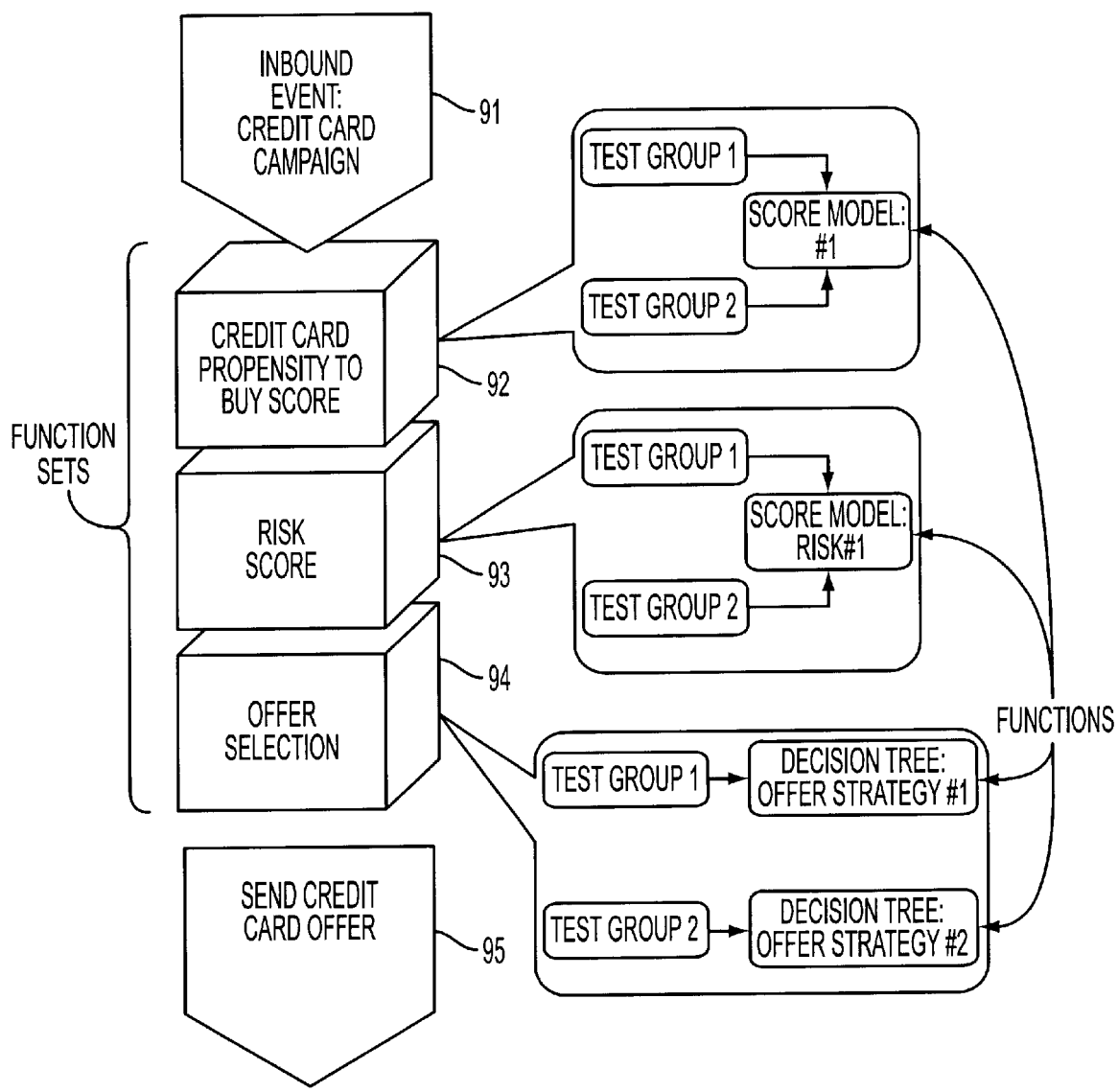
FIG. 5 (prior art) is a diagram illustrating the grouping of functions to function sets in a decision management system.
Figure 7:
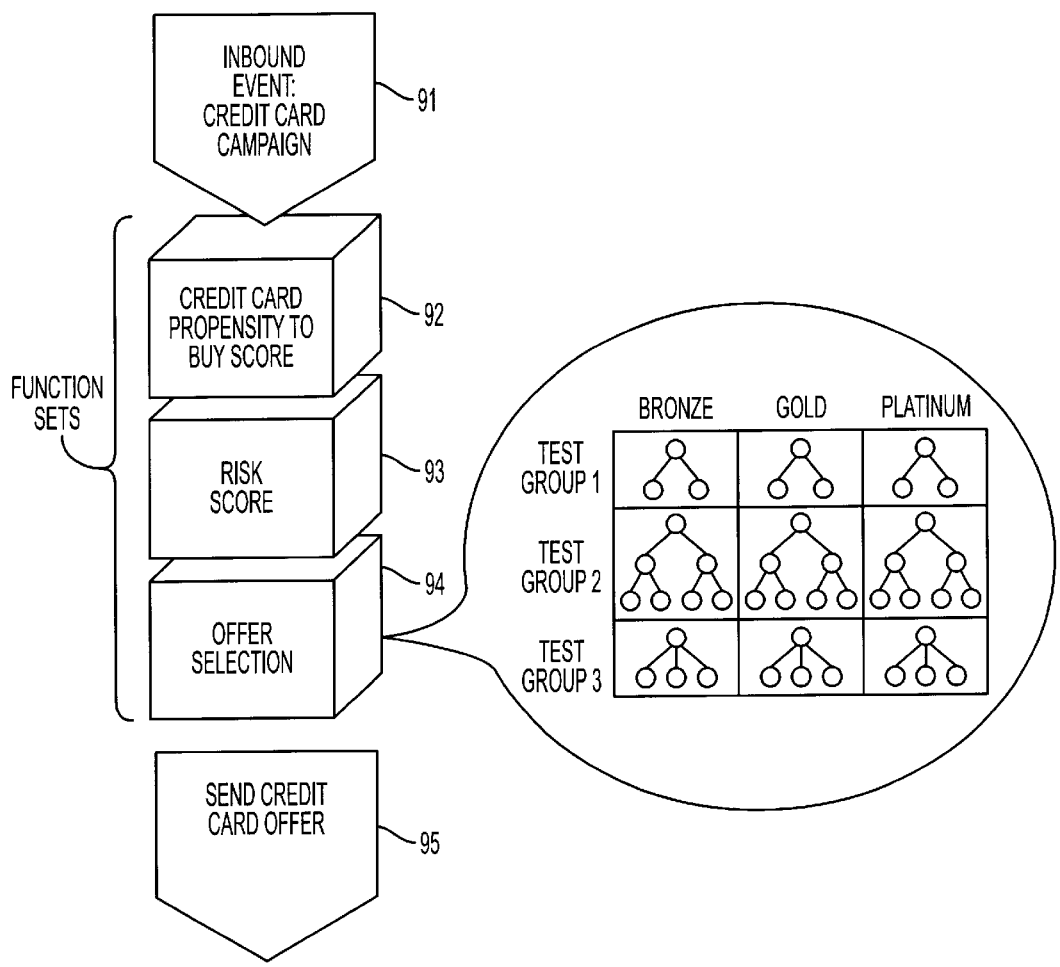
FIG. 7 (prior art) is a diagram illustrating the correspondence of functions of a respective function set to strategy test cells of a matrix, in a decision management system.
Figure 8:
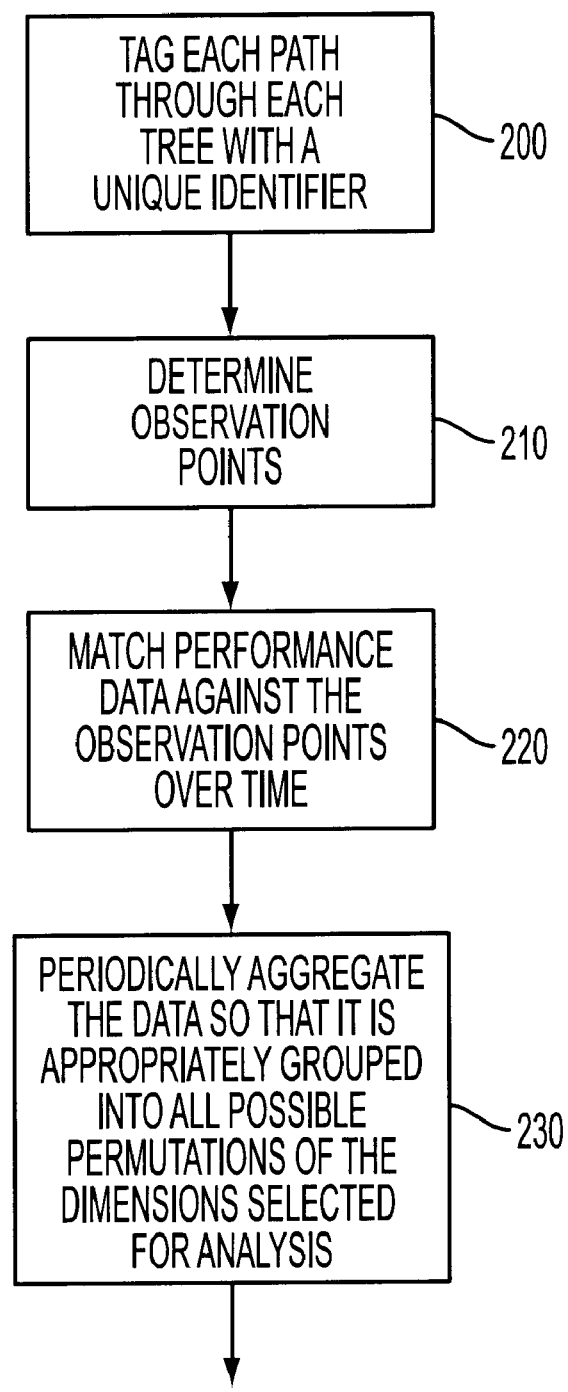
FIG. 8 (prior art) is a diagram illustrating an example of the overall operation of a decision management system for measuring performance.
Figure 10:
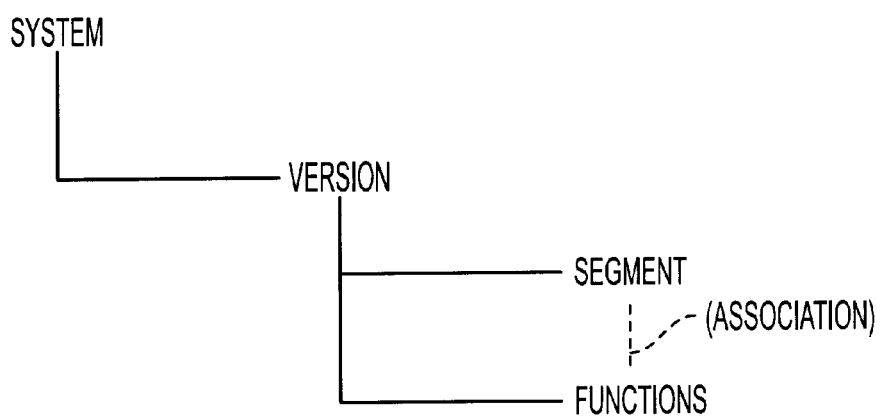
FIG. 10 (prior art) is a diagram illustrating an example of a definition hierarchy of a decision management system.
Figure 11A:
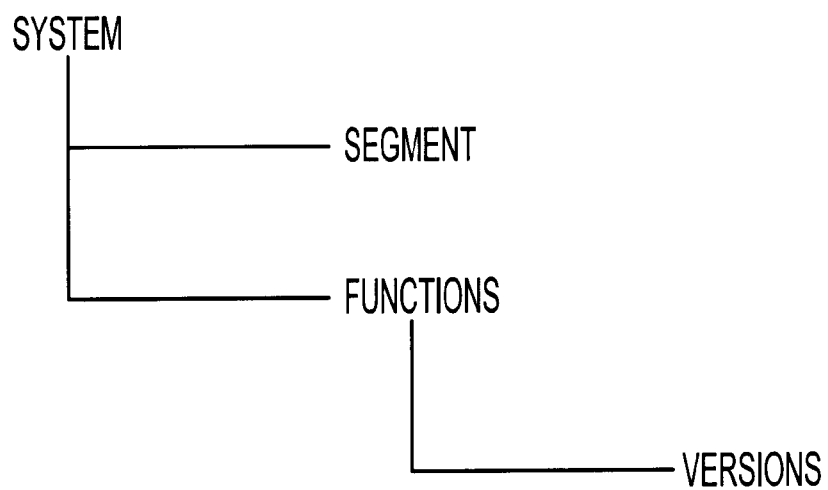
FIGS. 11(A) and 11(B) (prior art) are diagrams illustrating examples of definition hierarchies of a decision management system.
Figure 11B:
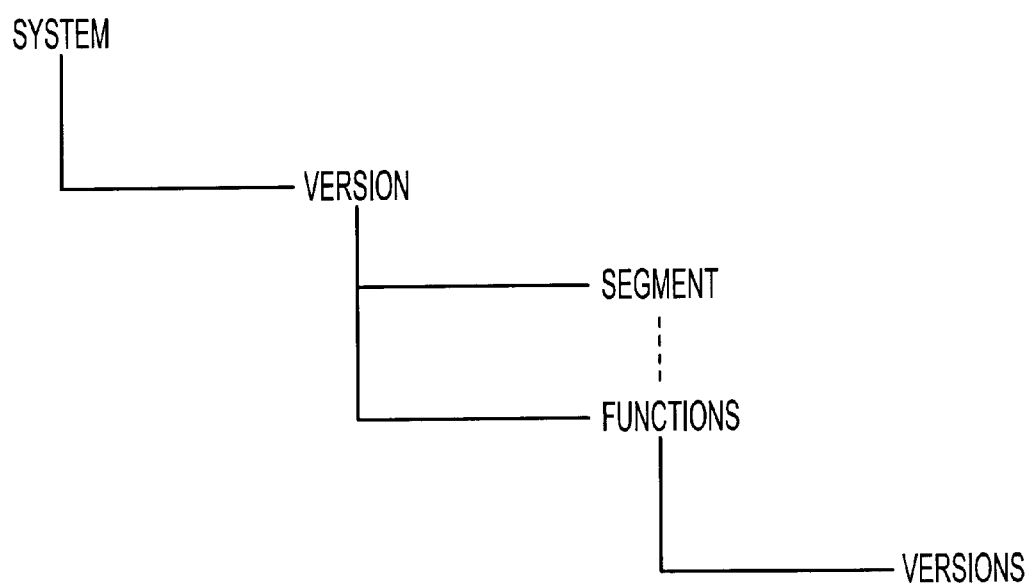
Figure 12:
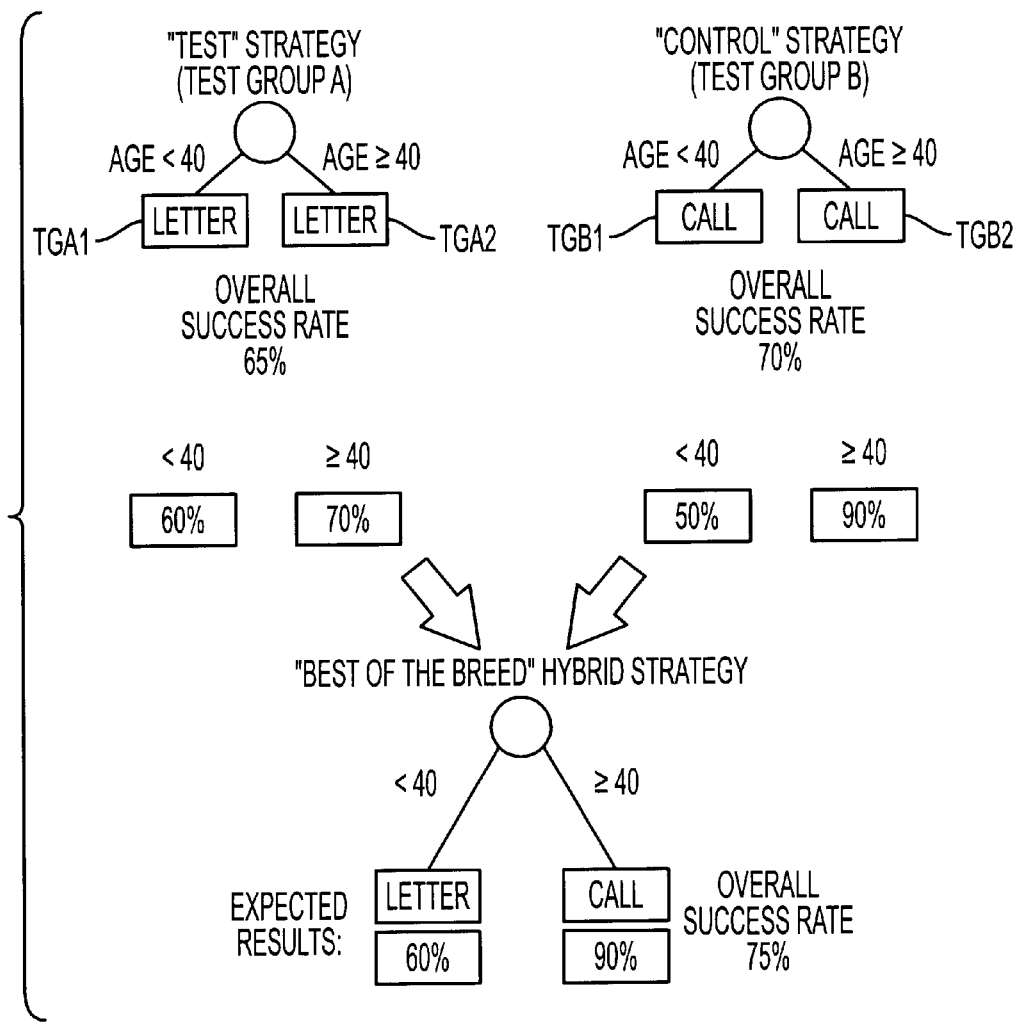
FIG. 12 (prior art) is a diagram illustrating the effectiveness of creating a hybrid strategy in a decision management system.

Reference will now be made in detail to the present preferred embodiments of the present invention, examples of which are illustrated in the accompanying drawings, wherein like reference numerals refer to like elements throughout.

Figure 13:
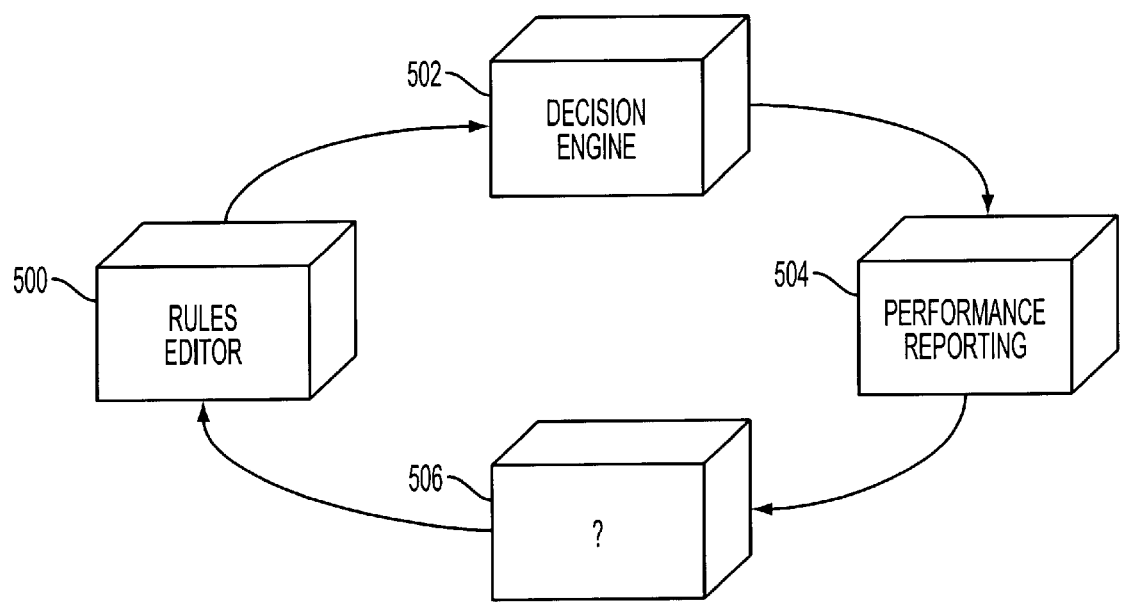
FIG. 13 (prior art) is a diagram illustrating the analysis of performance results and the recommendation of strategy changes in a conventional decision management system.
Figure 14:
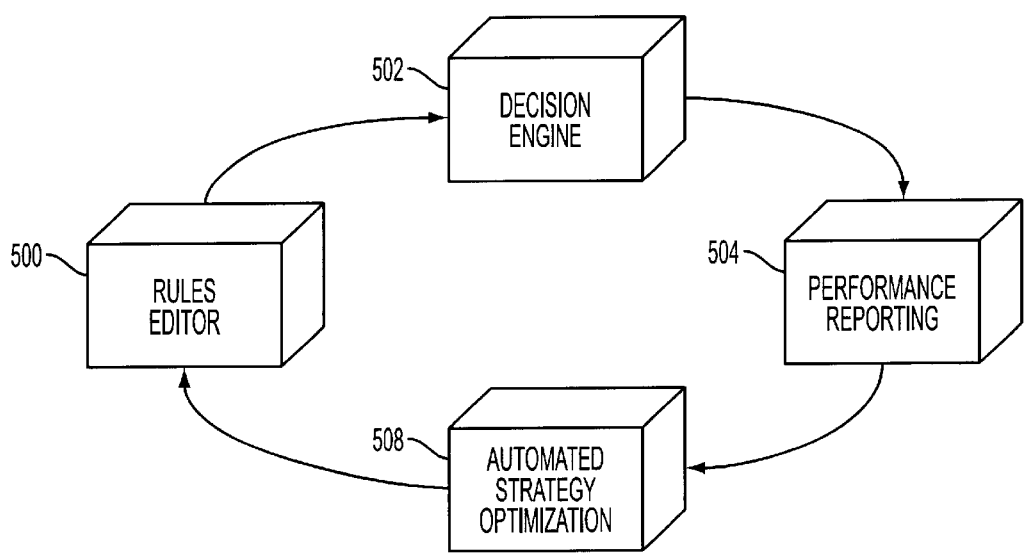
FIG. 14 is a diagram illustrating the analysis of performance results and the recommendation of strategy changes in a decision management system, according to an embodiment of the present invention.

FIG. 14 is a diagram illustrating the analysis of performance results and the recommendation of strategy changes in a decision management system, according to an embodiment of the present invention. FIG. 14 is similar to FIG. 13, but step 506 in FIG. 13 is replaced with step 508 in FIG. 14.

Referring now to FIG. 14, in step 508, automated strategy optimization is performed. More specifically, in step 508, the analysis of performance results and the recommendation of strategy changes is automated so that it is performed by a computer, thereby removing the end user from the analysis and potentially from the process of implementing the analysis.

For example, assume that a suite of ten (10) score models is used by the decision management system to predict risk. The performance of these score models may be measured by the number of clients who went delinquent. The automated strategy optimization in step 508 would, for example, examine the delinquency rate for the suite of ten models and identify the score model that had the lowest delinquency rate. The user could optionally specify a threshold such that the optimization would only produce/apply results where delinquency was lower than, for example, 3%. The automated strategy optimization would then, for example, recommend that the identified score model be used in place of all, or some of, the other score models.

To implement the analysis of performance results and the recommendation of strategy changes in FIG. 14, the data model of the decision management system should include the unique names/identifies for specific components, as these components may be optimized. For example, the actual identifies for each decision tree, score model and matrix should be stored in the data model. This information is needed so that the specific strategy components can be updated.

For example, FIG. 15 is a diagram illustrating an example of a row in a data model for aggregating and grouping performance data, according to an embodiment of the present invention. A data model having such a row would be used, for example, in the performance reporting of step 504 in FIG. 14. The row in FIG. 15 is similar to that in FIG. 9 as it includes a dimensions part and a metrics part. However, it should be noted that the row in FIG. 15 includes a "function" column as a dimension. This function column is needed to identify the various functions which may be optimized if these were the components on which optimization was being performed. Various aspects of a data model and table structures of a decision management system are disclosed in U.S. application titled USE OF ONLINE ANALYTICAL PROCESSING (OLAP) IN A RULES BASED DECISION MANAGEMENT SYSTEM, U.S. Ser. No. 09/217,016, filed Dec. 21, 1998, and which is incorporated herein by reference.

Figure 16:
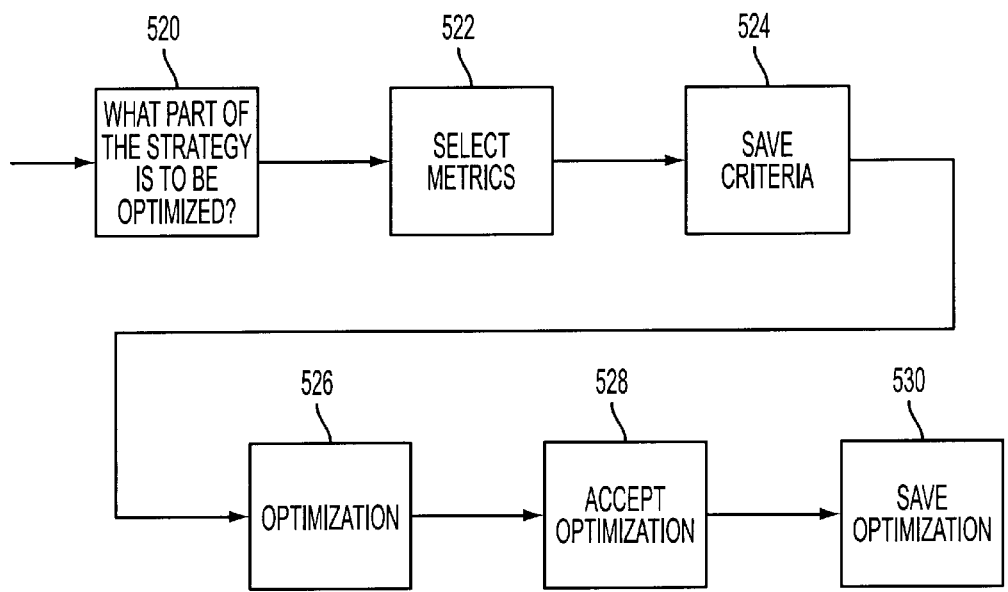
FIG. 16 is a diagram illustrating the overall logical flow of an automated strategy optimization process of a decision management system, according to an embodiment of the present invention.

FIG. 16 is a diagram illustrating the overall logical flow of the automated strategy optimization of step 508 in FIG. 14, according to an embodiment of the present invention. Referring now to FIG. 16, in step 520, the end user determines what part of the strategy is to be optimized. For example, the system displays an inquiry, such as "What part of the strategy should be optimized?", on the end user's desktop. The analysis could be for any strategy component. Here, a strategy component refers to any part of a strategy implemented in a decision management system. For example, a strategy component can be a system, version, attribute, inbound event, outbound event, function, function set, segment, report instruction, continuous dimension, test group or report group. Thus, the analysis could be for the entire strategy, or for an explicitly selected set of components (for example, for a specific set of ten score models).

Therefore, in step 520, the end user is selecting the dimensions for the optimization. These selected dimensions will be maintained in a multi-dimensional data model. The result of step 520 will preferably be a set of rows to be analyzed in the performance reporting data model.

As an example, in step 520, the end user might select the "originations" system (indicating, for example, a loan originations system), the "credit card" segment (indicating credit card accounts) of the originations system, and risk score model 1 and risk score model 2 (indicating the specific functions, i.e., score models) in the credit card segment of the originations system, on which the optimization will be performed. Thus, the selected dimensions would be system=originations, segment=credit card, function=risk model 1, risk model 2.

From step 520, the operation moves to step 522 where the end user selects the metrics for the selected dimensions. Preferably, the various metrics which are available, based on the type of component selected in step 520, are displayed for the end user on the end user's desktop. For example, if the end user selects specific risk models in step 520 to be optimized, the system preferably presents a list of selectable metrics which are applicable to those risk models. Such metrics might include, for example, delinquency rate of clients. These metrics can be given priorities by the end user. For example, the end user might indicate (a) what metrics should be used, (b) in what order they should be sorted and, (c) for each metric, whether it be evaluated in ascending or descending order. The end user might also specify thresholds such that performance of x% is necessary for results to be provided and potentially applied against the existing strategy.

For example, if two score models of a credit card segment of a loans originations system were being compared, the metrics used might be response rate and delinquency rate. Response rate might be selected as the first metric, with a higher response rate being preferable. Delinquency rate might be selected as the second metric, but with a lower delinquency rate being preferable. The end user preferably can choose to optionally combine two or more metrics into one for the purpose of performing the optimization (i.e., divide balance by credit limit and use the ratio in the analysis). The end user might require response rate to be over 30% for the optimum strategy.

Therefore, step 522 queries an appropriate table in the performance reporting data model to identify the columns that represent the metrics for the selected components to be used in the optimization process. The column may be associated with a lookup table. The end user will be asked to select the respective columns to be leveraged in the optimization, and a data model query will be developed which preferably indicates ascending/descending order for each column.

From step 522, the operation moves to step 524, where the end user is asked whether or not the criteria (that is, the dimensions and metrics) selected in steps 520 and 522 should be saved for future use so that the end user does not have to set the criteria each time the respective optimization is run. Criteria would be saved, for example, in new tables added to a Desktop data model (that is, a data model where the strategies are stored).

From step 524, the operation moves to step 526, where the optimization is run in accordance with the selected criteria. More specifically, strategy performance results are analyzed, and strategy changes are recommended in accordance with the analyzed performance results. This involves taking the criteria defined in steps 520 and 522, identifying the best performing component that meets the optionally specified threshold in the performance reporting data model, and then identifying the same component in the Desktop data model. For example, in the loan originations "system", within the credit card "segment", the end user may want to compare score model 1, score model 2 and score model 3 "functions." Based on the activation rate and utilization rate performance metrics, score model 2 may have the best performance. Score model 2 is then identified in the Desktop data model. Preferably, any components that invoke score model 2 are also identified by examining the interdependencies in the strategy. At this time, the end user is preferably prompted with the results and can make changes to allocate a greater percentage of clients to score model 2. Alternatively, the system can automatically identify the invoking components and make the changes automatically. In the later case, for example, a change may alter the percentage of the segmentation that leads to score model 2.

From step 526, the operation moves to step 528, where the end user is asked whether the results of the optimization are accepted. For example, the end user could be prompted to answer an inquiry as to whether or not the results of the optimization are accepted. This is an important step, as acceptance of the optimization results would alter the actual production strategy based upon the recommend changes in step 526. This process is made even more efficient if the end user is only prompted when specified thresholds are met.

Alternatively, instead of allowing the end user to determine whether the optimization results are accepted, the optimization could be set to run automatically without end user intervention. If desired, such automatic optimization could be run on a regularly scheduled interval. In such an automated mode, a report might be produced for later evaluation indicating the changes that were made. Thresholds become even more significant in this mode since the end user might not want changes made if only minimal improvement was realized.

In a preferred mode of still having minimal end user interaction, the end user would have the option to accept/reject some or all of the recommended changes. In either the automated mode or a mode which the end user has some input as to whether the optimization is accepted, the previous version of the strategies is preferably saved in order to allow the end user to undo the optimization changes, if necessary.

From step 528, the operation moves to step 530, where the end user is asked whether the results of the optimization should be saved. This capability will allow the end user to perform the optimization in several manners and compare the results in order to determine the preferred and most effective technique.

The logical flow in FIG. 16 represents only one possible logical flow, and many variations are possible, with or without some of the steps on FIG. 16. For example, steps 524, 528 and 530 are preferable, but not necessary since the end user does not have to be given the options provided by these steps. Moreover, the various inquires asked of the end user in FIG. 16 are only preferred inquires, and many different inquires can be asked.

FIG. 17 is a diagram illustrating an example of a table which might be created to save the criteria in step 524 of FIG. 16. This saved criteria includes the dimensions and metrics selected in steps 520 and 522 in FIG. 16. The table in FIG. 17 includes a "criteria order" column to indicate the order in which the respective criteria should be sorted, and an "ascending/descending" column to indicate whether the respective criteria should be evaluated in ascending or descending order, as selected by the end user. A "threshold" column stores any optionally specified thresholds for metrics.

Figure 18:
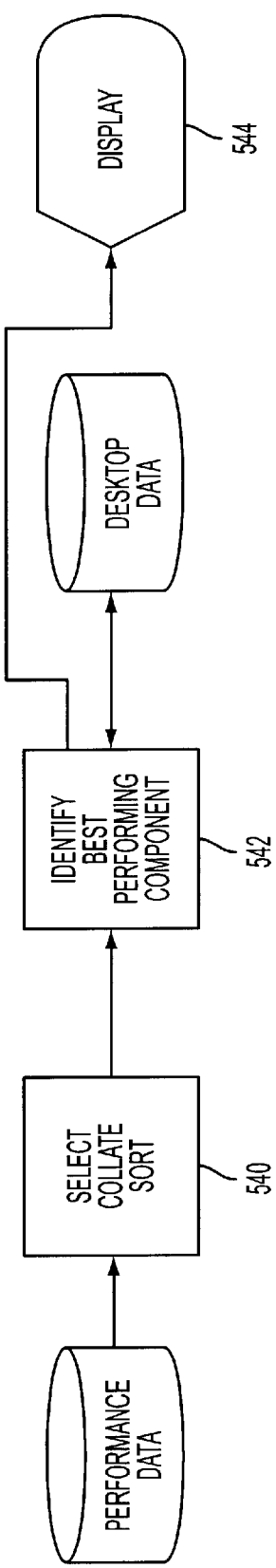
FIG. 18 is a diagram illustrating an optimization process, according to an embodiment of the present invention.

FIG. 18 is a diagram illustrating the optimization in step 526 of FIG. 16, according to an embodiment of the present invention. Referring now to FIG. 18, in step 540, the performance data based on an applied strategy is selected, collated and sorted.

From step 540, the operation moves to step 542 where the selected, collated and sorted performance data is analyzed to determine the best performing component. At this time, the Desktop data model may be accessed to obtain more information about the component and its inter-relationships in the strategy.

Therefore, the performance data represents results of the applied strategy. Steps 540 and 542 operate together to optimize the strategy in accordance with the results.

From step 542, the operation moves to step 544 where the determination of step 542 is displayed to the end user, preferably on the user's desktop.

Figure 19A:
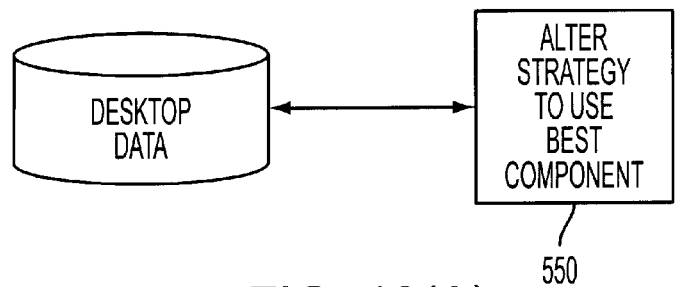
FIGS. 19(A), 19(B) and 19(C) are diagrams illustrating the acceptance of optimization, according to an embodiment of the present invention.
Figure 19B:
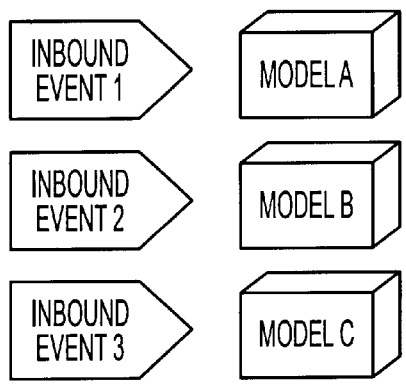
Figure 19C:
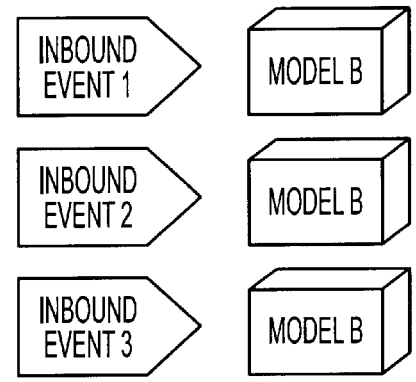

FIGS. 19(A), 19(B) and 19(C) are diagrams illustrating an example of the acceptance of optimization in step 528 in FIG. 16, according to an embodiment of the present invention. Referring now to FIG. 19(A), if the end user accepts the results of the optimization, or if the optimization is automatically implemented into the strategy, step 550 is performed so that the strategy in the Desktop data model is altered to use the best performing component. FIG. 19(B) shows an example of the correspondence of inbound events to score models (functions) before the strategy is altered. FIG. 19(C) shows an example of the correspondence of inbound events to score models after the strategy is altered to use the best performing component, assuming that score model B is the best performing component. Presumably the end user would eventually create new score models in an attempt to outperform model B.

Figure 20A:
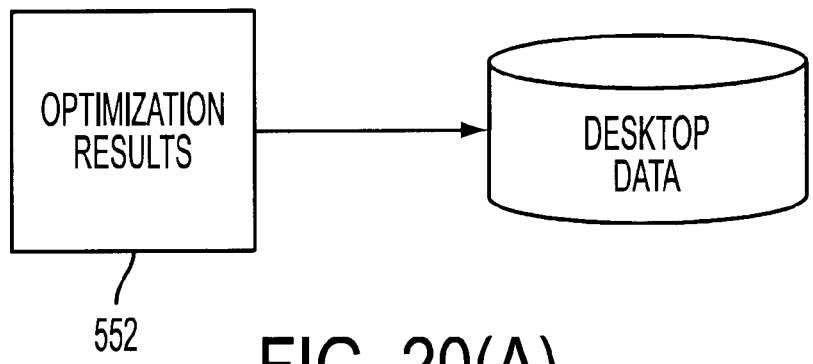
FIGS. 20(A) and 20(B) are diagrams illustrating the saving of an optimization, according to an embodiment of the present invention.
Figure 20B:
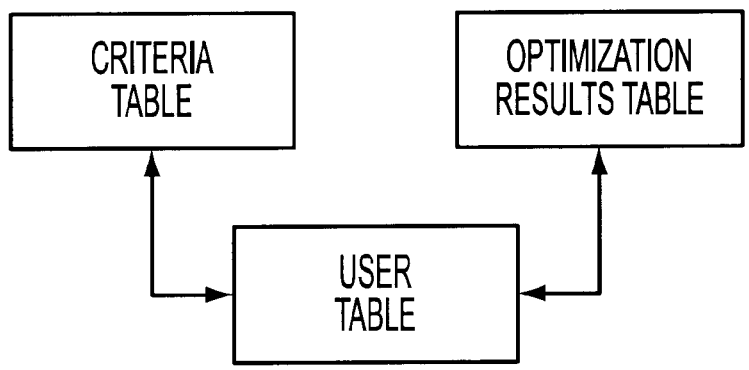

FIGS. 20(A) and 20(B) are diagrams illustrating the saving of the optimization in step 530 of FIG. 16. Referring now to FIG. 20(A), in step 552, the optimization results are saved to the Desktop data model. For example, as illustrated in FIG. 20(B), a criteria table and an optimization results table are linked to a user table. The criteria table would be a table as in, for example, in FIG. 17. The optimization results table contains the optimization results. The user tables indicates, for example, which end user ran the optimization or, if the optimization is running automatically, which end user indicated that the optimization is to run automatically. Of course, there are many different ways to save the optimization results, and the present invention is not limited to any particular manner of doing so. For example, different types of tables can be linked together. Moreover, it is possible to save the results without using linked tables and, instead, using different types of data structures.

Figure 21:
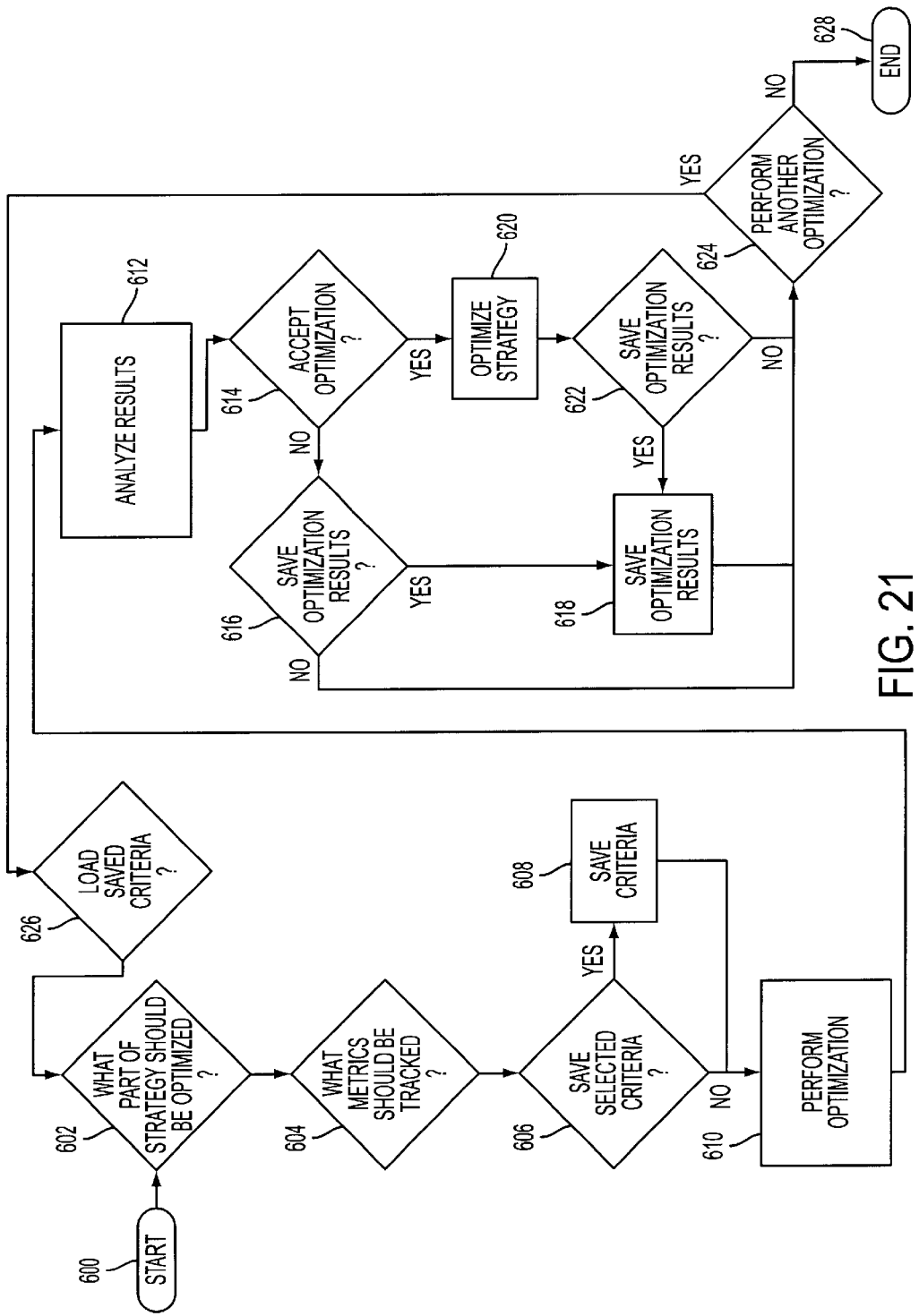
FIGS. 21–24 are flow charts illustrating the overall logical flow of using an automated strategy optimization process, according to various embodiments of the present invention.

FIG. 21 is a flow chart illustrating the overall logical flow of an optimization process in the context of a decision management system, according to an embodiment of the present invention. The logical flow in FIG. 21 corresponds to that in FIG. 16, but shows additional details.

Referring now to FIG. 21, the operation starts in step 600. From step 600, the operation moves to step 602 where the end user is asked what part of the strategy should be optimized. From step 602, the operation moves to step 604 where the end user is asked what metrics should be tracked and what thresholds, if any, should be set.

From step 604, the operation moves to step 606, where the end user is asked whether the criteria selected in steps 602 and 604 should be saved. If the end user indicates in step 606 that the criteria is to be saved, the operation moves to step 608 where the criteria is saved, and the operation then moves to step 610. If the end user indicates in step 606 that the criteria is not to be saved, the operation moves directly to step 610 without saving the criteria.

In step 610, the optimization is performed. After optimization in step 610, the operation moves to step 612 where the results of the optimization are analyzed.

From step 612, the operation moves to step 614 where the end user is asked whether the results of the optimization are to be accepted. If the end user indicates in step 614 that the optimization is not to be accepted, the operation moves to step 616 where the end user is asked whether the optimization results are to be saved. If the end user indicates in step 616 that the optimization results are to be saved, the operation moves to step 618 where the optimization results are saved, and then moves to step 624. If the end user indicated in step 616 that the optimization results are not to be saved, the operation moves directly to step 624 without saving the optimization results.

In step 614, if the end user indicates that the optimization is to be accepted, the operation moves to step 620 where the production strategy is actually optimized. From step 620, the operation moves to step 622 where the end user is asked whether the optimization results are to be saved. If the end user indicates in step 622 that the optimization results are to be saved, the operation moves to step 618 where the optimization results are saved. If the end user indicates in step 622 that the optimization results are not to be saved, the operation moves to step 624.

In step 624, the end user is asked whether another optimization is to be performed. If the end user indicates in step 624 that another optimization is to be performed, the operation moves to step 626 where the end user is asked whether saved criteria should be loaded for the next optimization, or whether new criteria should be created. Here, either some or all of existing, stored criteria could be loaded. Depending on what criteria is loaded, steps 602 and 604 may be eliminated for the next optimization. Similarly, if saved criteria exists, step 600 may start with step 626 rather than step 602. From step 626, the operation moves to step 602.

If the end user indicates in step 624 that there is not another optimization to be performed, the operation ends in step 628.

Figure 22:
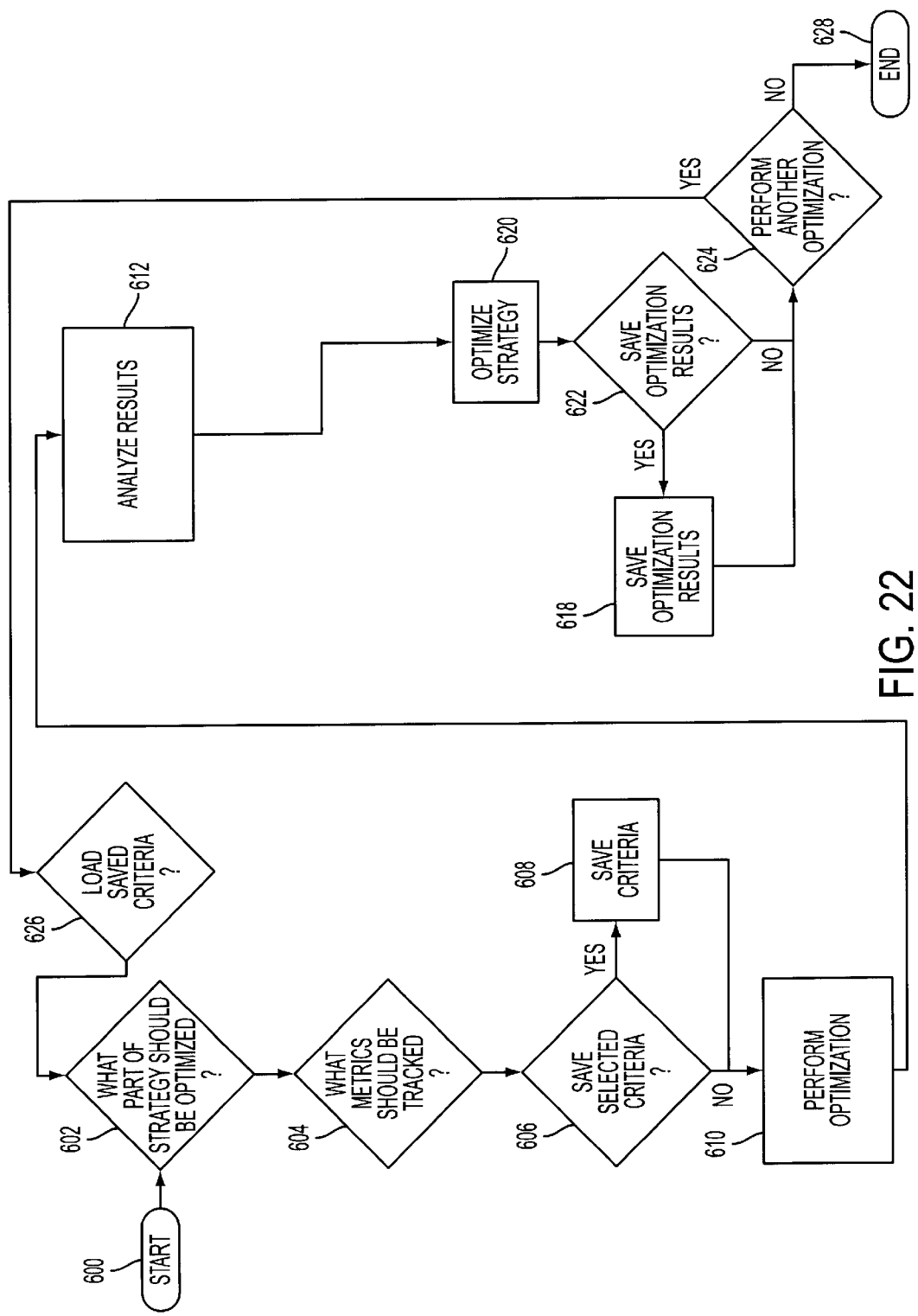

FIG. 22 is a modified flow chart of that in FIG. 21, in the case that the results of the optimization are automatically implemented in the production strategy. Therefore, FIG. 22 is similar to FIG. 21, except that steps 614 and 616 are eliminated.

According to the above embodiments of the present invention, components of a strategy can be optimized. The flow charts in FIGS. 21 and 22 work well for components down to the function level. For example, the flow charts in FIGS. 21 and 22 work well for optimizing decision trees of a strategy, or for optimizing higher-level components. However, it is possible to optimize components at levels lower than the function level. For example, various paths in a function can be optimized. For example, path A in tree 1 can be compared to path A in tree 2 and path A in tree 3.

Figure 23:
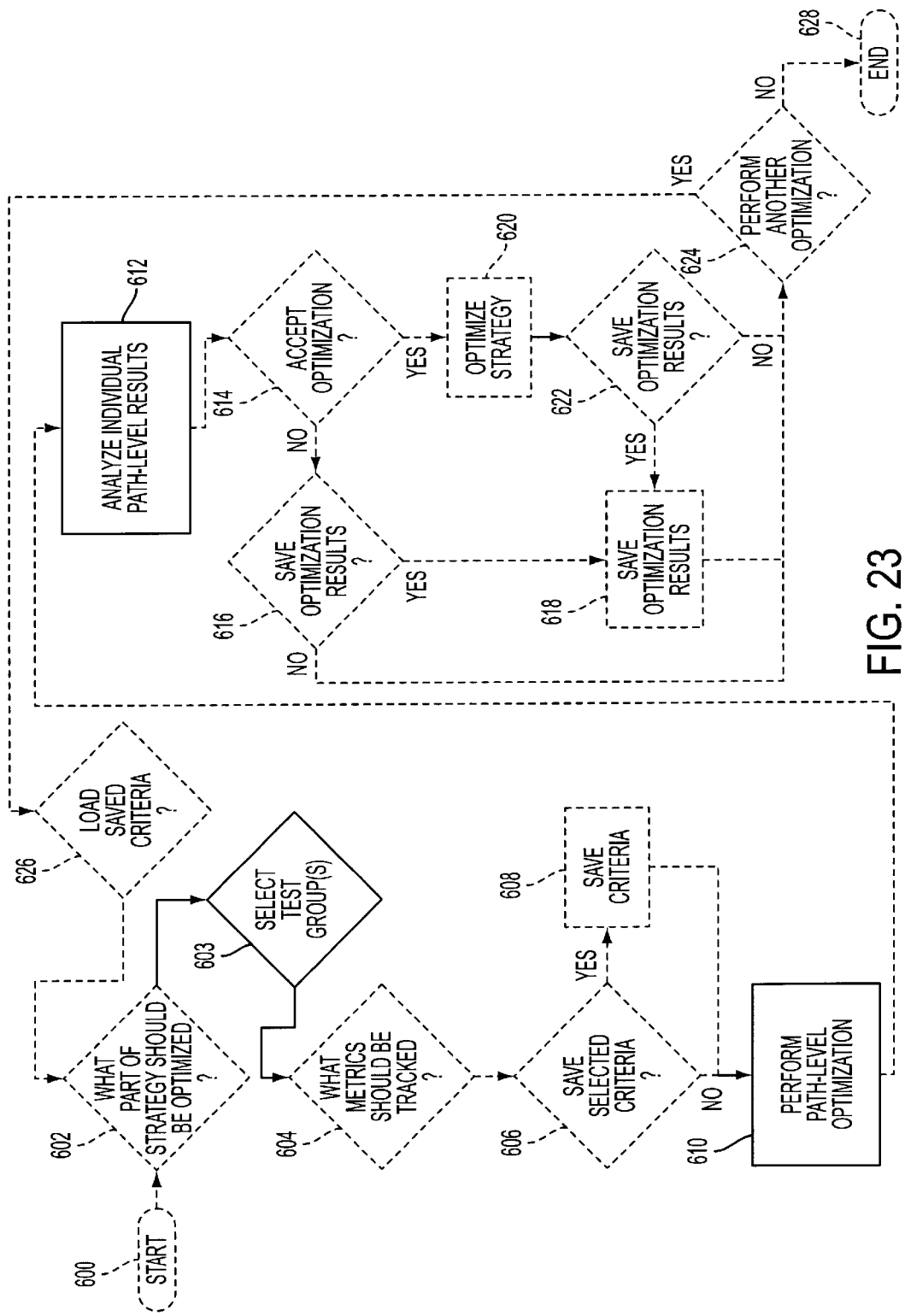

For example, FIG. 23 is a flow chart illustrating the overall logical flow of a decision management system for optimizing paths in a strategy, according to an embodiment of the present invention. The flow chart in FIG. 23 is similar to the flow chart in FIG. 21, but contains some modifications. Therefore, the following discussion will focus on the modifications.

Referring now to FIG. 23, step 603 is added between steps 602 and 604. In step 603, the end user selects the test group that is the current champion and/or the test group to which the end user wants the optimization process to be applied (i.e., the new champion).

Here, the current champion is the test group and associated strategy that proved to have the best performance in the last set of experiments conducted for a respective segment. The new champion is the test group that will represent the best strategy/strategy paths from a given experiment, encompassing both the decision criteria within the strategy and the decisions/actions that are taken once the respective criteria/paths are evaluated. The new champion becomes the "strategy to beat" and hence the current champion for the next experiment(s).

Often, though not necessarily, the champion strategy has a higher proportion/percentage of the population relative to other experiments/test groups since it is proven to provide an expected level of performance.

In FIG. 23, step 610 is modified so that "path-level" optimization is performed. Here, the optimization would not only compare entire components (i.e., trees/matrices), but would compare the individual paths of respective higher-level components. In a decision tree, a path might be identified by a report group. For example, the same report group (thus signifying the same path) might be compared across trees with the best performing decision for that path being selected for the new champion. In a matrix, for example, each cell might be compared to the same cells in other matrices (i.e., comparable x,y coordinates), with the action at the cell being applied to the new champion matrix. In a preferred mode of implementation, paths are identical such that they are statistically comparable, but the actions (decisions, cell values, etc.) vary from one component to the next. Therefore, step 612 in FIG. 23 is modified to indicate that individual path-level results are analyzed.

Figure 24:
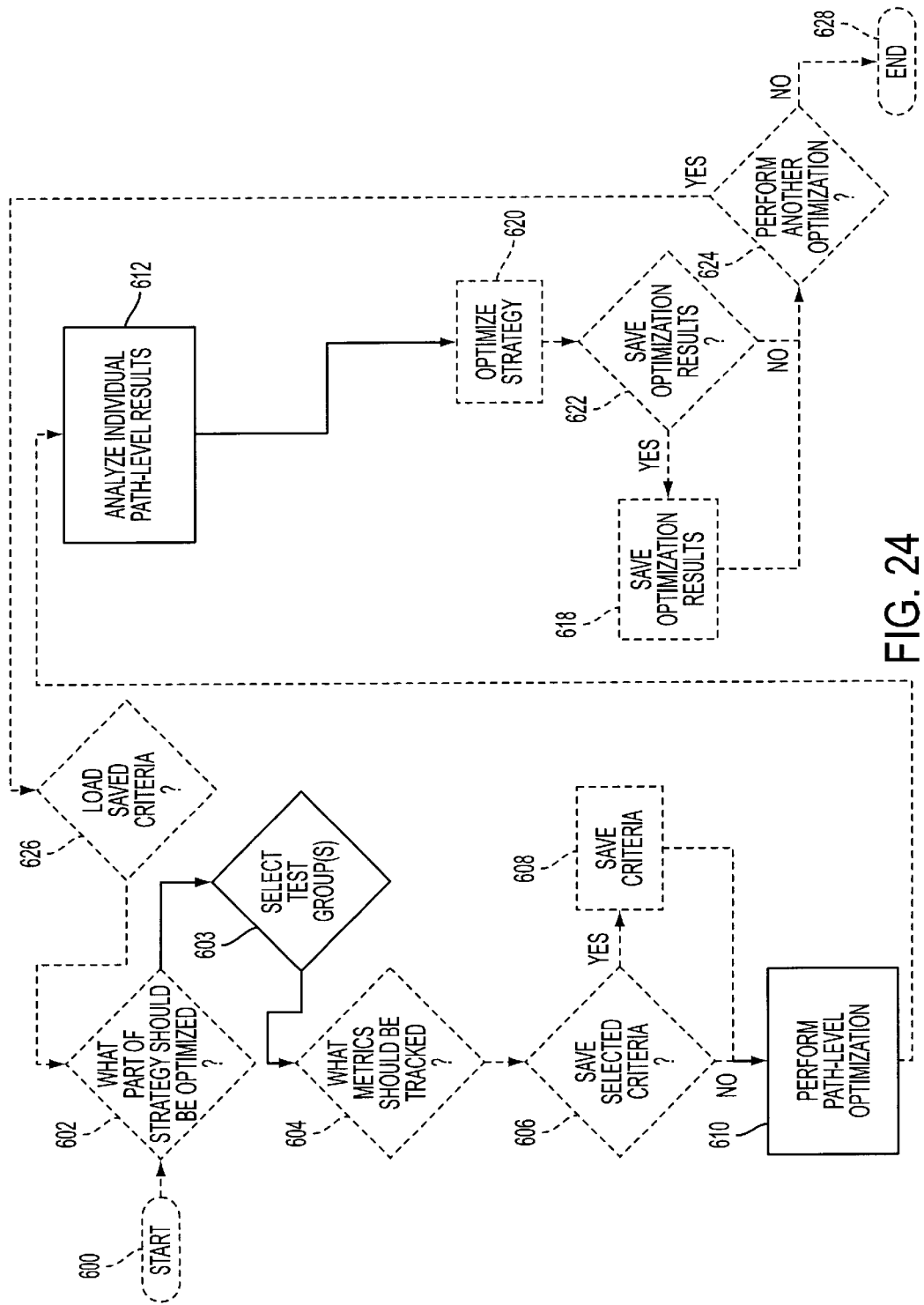

FIG. 24 is a modified flow chart of that in FIG. 23, in the case that the results of the path-level optimization are automatically implemented in the production strategy. Therefore, FIG. 24 is similar to FIG. 23, except that steps 614 and 616 are eliminated.

FIG. 25 is a diagram illustrating a row in a data model for aggregating and grouping performance data in the case that path-level optimization is performed, according to an embodiment of the present invention. A data model having such a row would be used, for example, in the performance reporting of step 504 in FIG. 14. The row illustrated in FIG. 25 is similar to that in FIG. 15, but includes columns to indicate the test group and report group.

Figure 26:
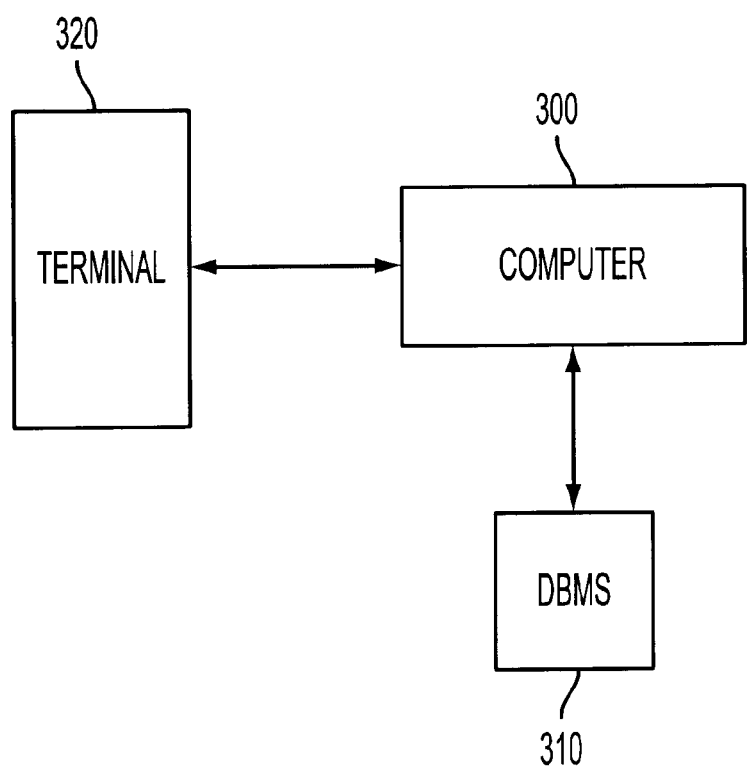
FIG. 26 is a diagram illustrating a simplified hardware architecture of a decision management system, according to an embodiment of the present invention.

FIG. 26 is a diagram illustrating a simplified hardware architecture of a decision management system, according to an embodiment of the present invention. Referring now to FIG. 26, the decision management system is embodied in software stored in a computer-readable medium, such as a memory of a computer 300. Computer 300 can be, for example, a server and associated memory. Computer 300 preferably has access to a data base management system (DBMS) 310 for storing and accessing accumulated data. An end user accesses computer 300 possibly via a terminal 320 which can be, for example, a PC. There are many different types of hardware configurations, including many different types of client/server architectures, which can be used. Such hardware configurations would be understood by a person of skill in the art.

Figure 27:
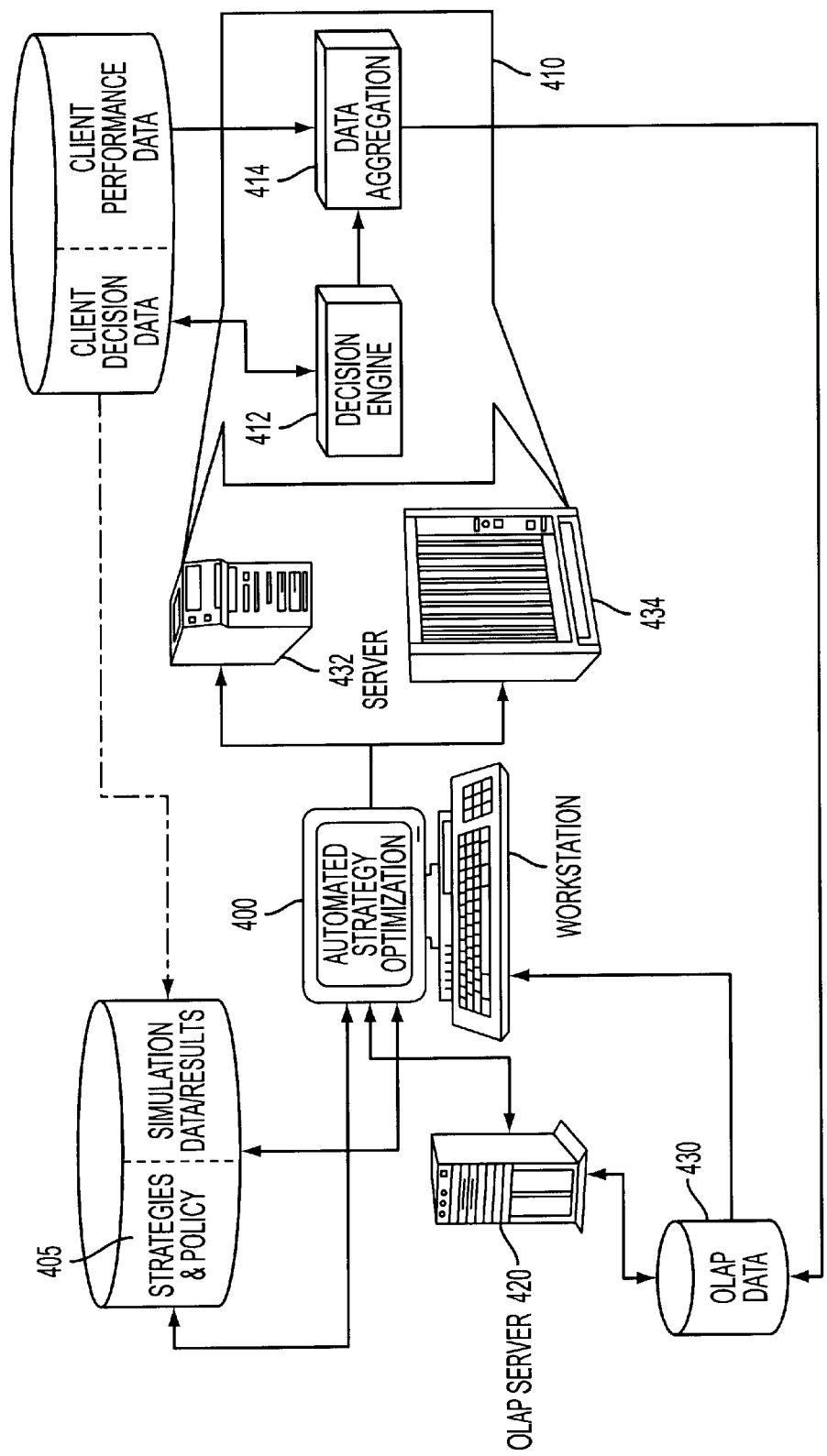
FIG. 27 is a diagram illustrating a detailed hardware architecture of a decision management system, according to an embodiment of the present invention.

For example, FIG. 27 is a diagram illustrating a more detailed hardware architecture of a decision management system, according to an embodiment of the present invention. Referring now to FIG. 27, a workstation 400 provides a centralized user interface through which a strategy analyst, or system user, can control the system. The primary purpose of workstation 400 is to enable the entry, maintenance and propagation of decision strategies and simulation parameters to a decision engine/data aggregation platform 410 which includes a decision engine 412 and a data aggregation component 414. The automated strategy optimization process would be initiated from workstation 400 and all user interaction would occur here. The actual optimization process might run here or on other shared or dedicated hardware.

The decision strategies reside in a relational data model 405 while they are being edited, maintained, and selected for simulation/production. Therefore, relational data model 405 represents the Desktop data model. Workstation 400 also provides access to OLAP analysis and reporting systems, possibly via an OLAP server 420, and consistently using an OLAP database 430. A server 432 and a mainframe 434 typically run different processing modes, and provide the processing power for decision engine/data aggregation platform 410.

Decision engine 412 deploys the business decisioning rules and simulation parameters entered on workstation 400 against client data. This architecture is highly scaleable and can operate in both on-request or batch processing modes as well as in both mainframe and client/server environments.

Potentially sharing the same environments as decision engine 412 is data aggregation component 414. Data aggregation component 414 is responsible for matching/merging decision engine output (i.e., scores and decisions) with the results of enacting recommendations of decision engine 412. Data aggregation component 414 provides the information that OLAP server 420 accesses to provide strategy performance.

The OLAP portion of the system preferably uses a one to four tier architecture to allow a strategy analyst to do multidimensional analysis on the results of deployed strategies. The OLAP portion of the system can be extremely scaleable through leveraging the following configurations: data resides locally with a graphical reporting user interface (1 tier), data resides independently from the graphical reporting user interface (2 tiers), a server resides between the user interface and the data to expedite query requests and monitor strategy results (3 tiers) and/or a web server resides between the user interface and the OLAP server to enable mass browser-based distribution of reports (4 tiers). OLAP's multidimensional qualities provides analysts with the flexibility to "mine" their results, examining relationships in the data as well as the ability to perform ad hoc calculations and re-format views as required.

A decision management system as described above is embodied, for example, in software stored in a computer-readable medium, such as a memory of a computer. However, a computer-readable medium is not intended to be limited to a memory of a computer. Instead, a computer-readable medium can be, for example, a computer disk, an optical disk or any other medium which is readable by a computer.

The present invention relates to software-based decision management systems. As can be seen from above, software-based decision management systems are systems which apply strategies to determine actions to be taken, monitor performance based on the taken actions, and refine the strategies in accordance with the monitored performance. The strategies that are applied and refined by a decision management system can be referred to as "decision management strategies."

Therefore, according to embodiments of the present invention, a strategy of a decision management system is automatically optimized. Here, the term "automatically" indicates that the optimization is performed by a computer without human intervention (but potentially based on human parameters). For example, as described above, the decision management system optimizes the strategy by analyzing performance data. The performance data is stored in a computer readable form which is not typically understood or searched by humans, particularly those who are end users of the system versus technical developers. However, such optimization as performed via the computer readable data is easily performed by a computer via well-known software techniques.

According to embodiments of the present invention, a strategy is optimized. Here, a strategy is "optimized" by improving the performance of the strategy. To optimize a strategy, it is not necessary that the best, or most effective, strategy changes be determined, although this is preferable. Instead, changes must be determined which simply improve the performance of the strategy over that before optimization. Moreover, "optimizing" a strategy does not require that the strategy actually be implemented in production. Instead, for example, optimizing a strategy refers to the determination of changes to the strategy to improve performance, such as those in step 610 of FIG. 21. By contrast, implementing the strategy in production refers to actually making the changes in the production strategy. Implementing the strategy refers, for example, to the operation performed in step 620 of FIG. 21.

According to the above embodiments of the present invention, an apparatus includes a computer-implemented strategy creator, and a computer-implemented strategy optimizer. The strategy creator creates and applies a decision management strategy. The strategy optimizer automatically optimizes at least a part of the strategy in accordance with results of the applied strategy. A computer, such as computer 300 in FIG. 26, which performs various of the above-described operations, could operate as such a strategy creator and strategy searcher.

Various of the above embodiments of the present invention relate to a user's desktop. For example, data can be entered or accessed by an end user via the user's desktop. The concept of a desktop is well-known in the art, and generally refers to the primary window in an application that supports multiple windows (screens).

According to the above embodiments of the present invention, a decision management strategy is applied. Results of the applied strategy are determined. At least a part of the strategy is automatically optimized in accordance with the determined results. Criteria can be selected by an end user for optimizing the strategy, so that the strategy is automatically optimized in accordance with the selected criteria. The selected criteria can include dimensions having respectively corresponding thresholds, each threshold indicating that the strategy is to be optimized in accordance with the corresponding dimension if performance results of the dimension satisfy the threshold.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A computer-implemented decision management process comprising:

applying a decision management strategy for controlling behavior of clients of an organization, the strategy being formed of components operating together, the components being at least one of the group consisting of an attribute, a function, a function set, a segment, a test group and a report group;

determining results of the applied strategy;

selecting, by an end user of the process, a respective component forming the strategy for optimization;

selecting, by the end user, potential replacement components and performance metrics for the potential replacement components;

applying the selected potential replacement components to prior performance data of the clients;

determining results of the applied potential replacement components; and automatically optimizing the selected component forming the strategy, without optimizing the other components forming the strategy, in accordance with the determined results of the applied strategy, the determined results of the applied potential replacement components, and the metrics, to achieve goals of the organization, wherein the selected performance metrics includes a threshold for the potential replacement components, said automatically optimizing replacing the selected component with a respective potential replacement component if performance improvement results of the respective potential replacement component satisfy the threshold.

2. A process as in claim 1, further comprising:

implementing the strategy with the optimized component in production.

3. A process as in claim 1, further comprising:

automatically implementing the strategy with the optimized component in production.

4. A process as in claim 1, further comprising:

providing the end user the ability to select whether the strategy with the optimized component is to be implemented in production; and, when the end user selects that the strategy with the optimized component is to be implemented in production, implementing the strategy with the optimized component in production.

5. A process as in claim 1, further comprising:

saving the selected performance metrics for use in a subsequent optimization of a component of the strategy.

6. A process as in claim 1, further comprising:

saving the selected performance metrics; and performing a subsequent optimization of a component of the strategy by automatically optimizing the component in accordance with the saved performance metrics.

7. A process as in claim 1, further comprising:

saving results of said automatically optimizing.

8. A process as in claim 1, wherein said automatically optimizing automatically optimizes respective paths through the strategy.

9. A computer-implemented decision management process comprising:

applying a decision management strategy for controlling behavior of clients of an organization, the strategy being formed of a plurality of strategy components, the strategy components being at least one of the group consisting of an attribute, a function, a function set, a segment, a test group and a report group;

selecting a respective strategy component by an end user of the process;

selecting, by the end user, potential replacement components and performance metrics for the potential replacement components;

applying the selected potential replacement components to prior performance data of the clients;

determining results of the applied potential replacement components; and automatically optimizing the selected strategy component, without optimizing the other components forming the strategy, by replacing the selected strategy component with a respective potential replacement component if the determined results of the applied potential replacement components indicate that the respective potential replacement component achieved a threshold with respect to the selected performance metrics.

10. A process as in claim 9, further comprising:

automatically implementing the strategy with the optimized component in production.

11. A process as in claim 9, further comprising:

providing the end user the ability to select whether the strategy with the optimized component is to be implemented in production; and, when the end user selects that the strategy with the optimized component is to be implemented in production, implementing the strategy with the optimized in production.

12. A process as in claim 9, wherein said automatically optimizing automatically optimizes respective paths through the strategy.

13. A process comprising:

providing a decision management system which applies a strategy to determine actions to be taken for controlling behavior of clients of an organization, monitors performance based on the taken actions, and refines the strategy in accordance with the monitored performance, the strategy being formed of components operating together, the components being at least one of the group consisting of an attribute, a function, a function set, a segment, a test group and a report group;

selecting a component of the strategy by an end user of the decision management system;

selecting, by the end user, a potential replacement component and performance metrics for the potential replacement component;

applying the selected potential replacement component to prior performance data of the clients;

determining results of the applied potential replacement component;

automatically optimizing the selected component of the strategy, without optimizing the other components forming the strategy, by replacing the selected strategy component with the potential replacement component if the determined results of the applied potential replacement component indicate that the potential replacement component achieved a threshold with respect to the selected performance metrics.

14. A computer-implemented decision management apparatus comprising:

means for applying a decision management strategy for controlling behavior of clients of an organization, the strategy being formed of components operating together, the components being at least one of the group consisting of an attribute, a function, a function set, a segment, a test group and a report group;

means for selecting a respective component of the strategy by an end user of the decision management apparatus;

means for selecting, by the end user, a potential replacement component and performance metrics for the potential replacement component;

means for applying the selected potential replacement component to prior performance data of the clients;

means for determining results of the applied potential replacement component;

means for automatically optimizing the selected component forming the strategy, without optimizing the other components forming the strategy, by replacing the selected strategy component with the potential replacement component if the determined results of the applied potential replacement component indicate that the potential replacement component achieved a threshold with respect to the selected performance metrics.

15. An apparatus comprising:

a strategy creator creating and applying a decision management strategy for controlling behavior of clients of an organization, the strategy being formed of components operating together, the components being at least one of the group consisting of an attribute, a function, a function set, a segment, a test group and a report group; and a strategy optimizer automatically optimizing a component of the strategy selected by an end user of the strategy optimizer by selecting, by the end user, a potential replacement component and performance metrics for the potential replacement component, applying the selected potential replacement component to prior performance data of the clients, determining results of the applied potential replacement component, automatically optimizing the selected component of the strategy, without optimizing the other components forming the strategy, by replacing the selected strategy component with the potential replacement component if the determined results of the applied potential replacement component indicate that the potential replacement component achieved a threshold with respect to the selected performance metrics.

* * * * *

UNITED STATES PATENT AND TRADEMARK OFFICE
CERTIFICATE OF CORRECTION

PATENT NO. : 6,708,155 B1
DATED : March 16, 2004
INVENTOR(S) : Laurence Honarvar et al.

It is certified that error appears in the above-identified patent and that said Letters Patent is hereby corrected as shown below:

Column 20,
Lines 9-10, delete "the group consisting of"

Column 21,
Lines 4-5, delete "the group consisting of"

Column 22,
Lines 12-13, delete "the group consisting of"
Line 39, delete "the group consisting of".

Signed and Sealed this

First Day of June, 2004

JON W. DUDAS
*Acting Director of the United States Patent and Trademark Office*